(12) United States Patent
Zheng et al.

(10) Patent No.: US 6,804,255 B1
(45) Date of Patent: Oct. 12, 2004

(54) HARDWARE IMPLEMENTATION OF CHANNEL SCHEDULING ALGORITHMS FOR OPTICAL ROUTERS WITH FDL BUFFERS

(75) Inventors: Si Qing Zheng, Plano, TX (US); Yijun Xiong, Plano, TX (US); Marc L. J. Vandenhoute, Dallas, TX (US)

(73) Assignee: Alcatel, Paris (FR)

( * ) Notice: Subject to any disclaimer, the term of this patent is extended or adjusted under 35 U.S.C. 154(b) by 784 days.

(21) Appl. No.: 09/689,584

(22) Filed: Oct. 12, 2000

(51) Int. Cl.[7] .............................................. H04L 12/56
(52) U.S. Cl. ......................................................... 370/468
(58) Field of Search ................................ 370/351, 352, 370/355, 357, 386, 401, 464, 465, 437, 468; 398/45, 48, 49, 51, 52, 53, 54

(56) References Cited

U.S. PATENT DOCUMENTS

| | | | |
|---|---|---|---|
| 5,416,769 A | 5/1995 | Karol | 370/60 |
| 5,469,284 A | 11/1995 | Haas | 359/139 |
| 5,486,943 A | 1/1996 | Sasayama et al. | 359/123 |
| 5,734,486 A | 3/1998 | Guillemot et al. | 359/139 |
| 5,737,106 A | 4/1998 | Sansonetti et al. | 359/140 |

OTHER PUBLICATIONS

Tancevski et al. "Performance of an Optical IP Router Using Non-Degenerate Buffers". IEEE. 1999. pp. 1454–1459.*
Tancevski et al. "A New Scheduling Algorithm for Asynchronous, Variable Length IP Traffic Incorporating Void Filling", IEEE. Feb. 21–26, 1999. pp. 180–182.*
Karasan et al. "Effects of Wavelength Routing and Selection Algorithms on Wavelength Conversion Gain in WDM Optical Networks". IEEE. Apr. 1998. pp. 186–196.*
Chen et al. "WDM Burst Switching for Petabit Capability Routers". IEEE. Nov. 3, 1999, pp. 958–973.*
Qiao et al. "Labeled Optical Burst Switching for IP–over–WDM Integration". IEEE. Sep. 2000, pp. 104–114.*
Xiong et al. "Control Architecture in Optical Burst–Switching WDM Networks". IEEE. Oct. 2000. pp. 1838–1851.*
*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs.).
*All–Optical Networking: Architecture, Control, and Management Issues*, by John M. Senior and Chunming Qiao, SPIE–The International Society of Optical Engineering, Nov. 3–5, 1998, vol. 3531, pp. 456–464.
*Terabit Burst Switching*, by Jonathan S. Turner, Journal of High Speed Networks 8 (IOS Press) (1999) pp. 3–16.

* cited by examiner

*Primary Examiner*—Chi Pham
*Assistant Examiner*—Derrick W Ferris
(74) *Attorney, Agent, or Firm*—Gray Cary; Jessica W. Smith; V. Lawrence Sewell

(57) ABSTRACT

A system and method for implementing channel scheduling algorithms in an optical router wherein a scheduler operates pursuant to an algorithm and is capable of determining the availability of outbound data channels capable of carrying a data packet of duration B. The scheduler is further capable of selecting one channel from available data channels and assigning the data packet to the selected channel. The scheduler then updates state information of the selected data channel, but if no data channel is available to carry the data packet the data packet is dropped.

26 Claims, 22 Drawing Sheets

Building blocks of the architecture.

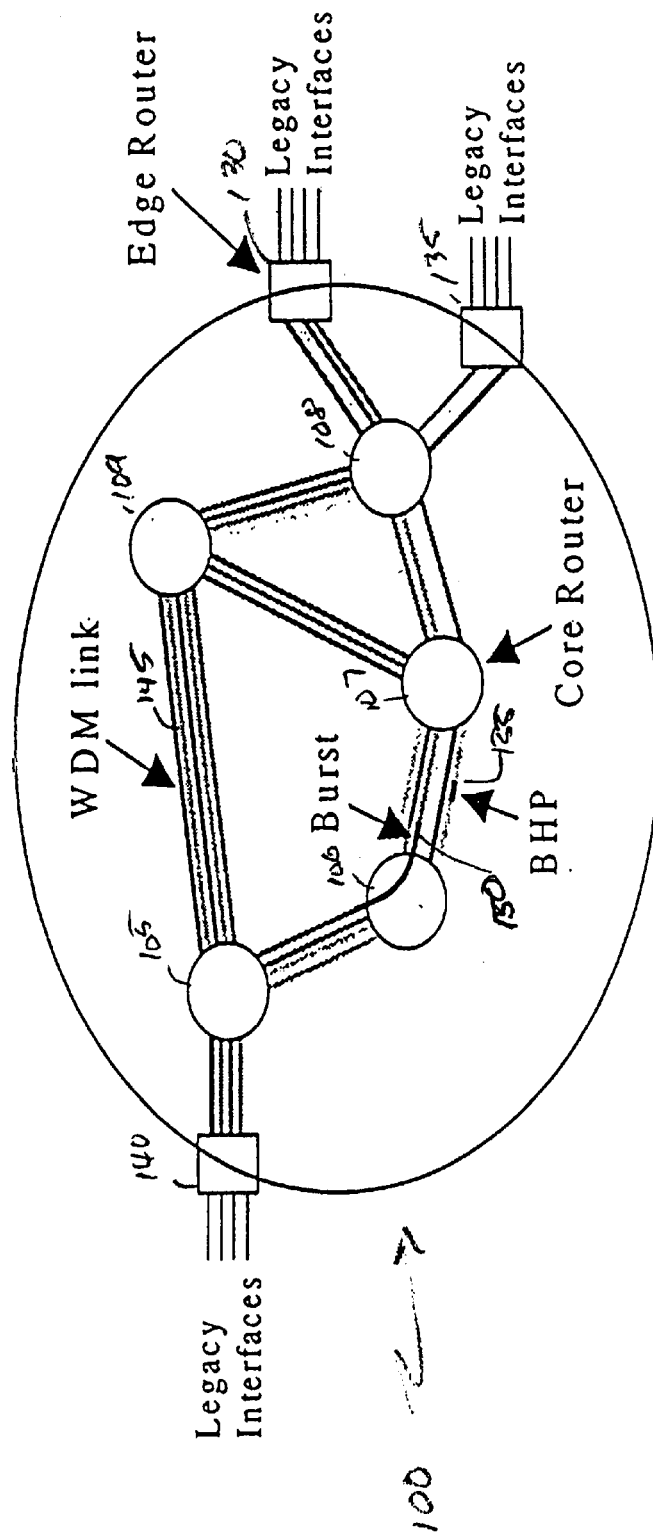
Figure 1: An optical burst-switched network.
BHP: Burst Header Packet

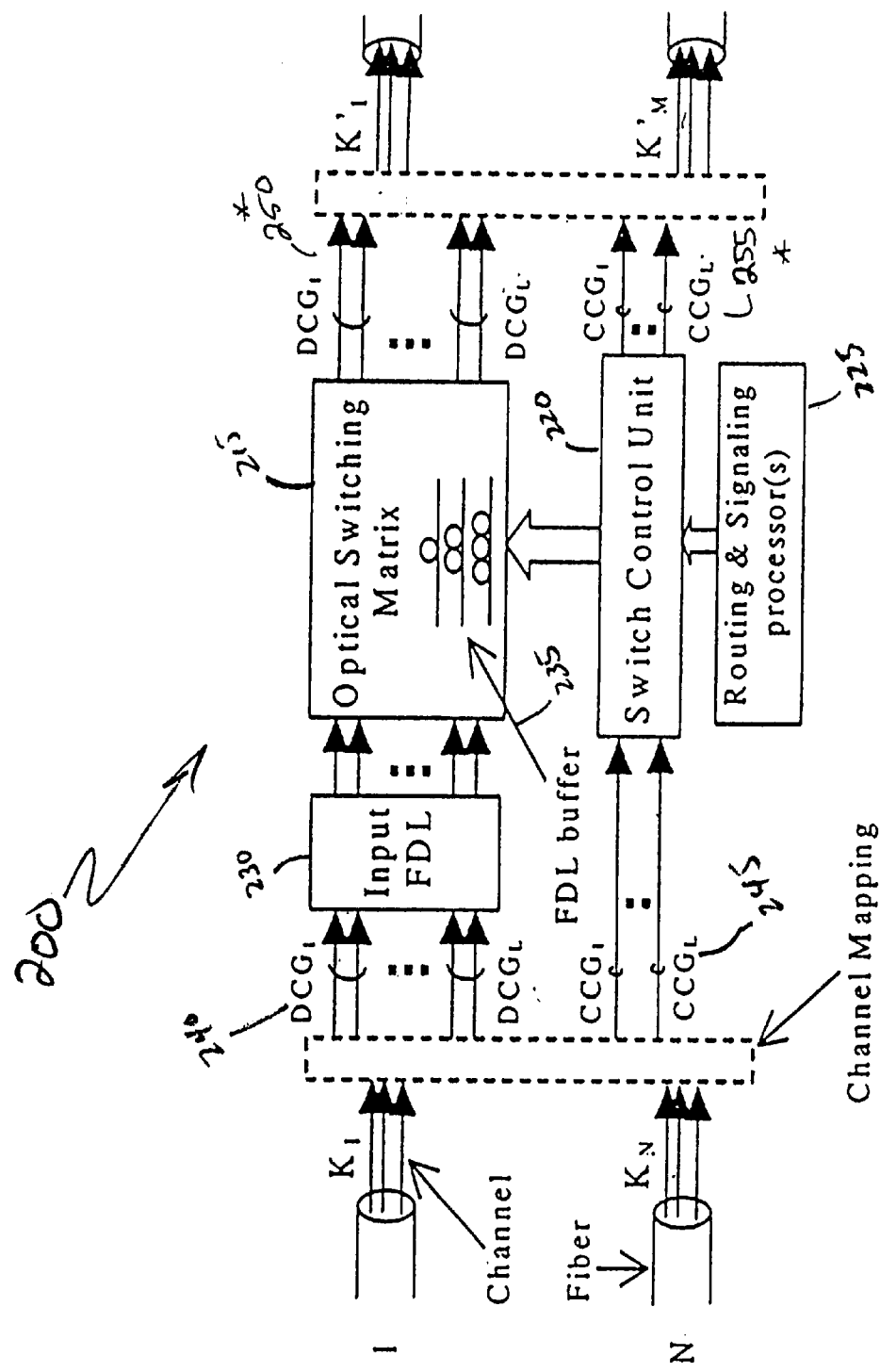
Figure 2: General architecture of optical routers

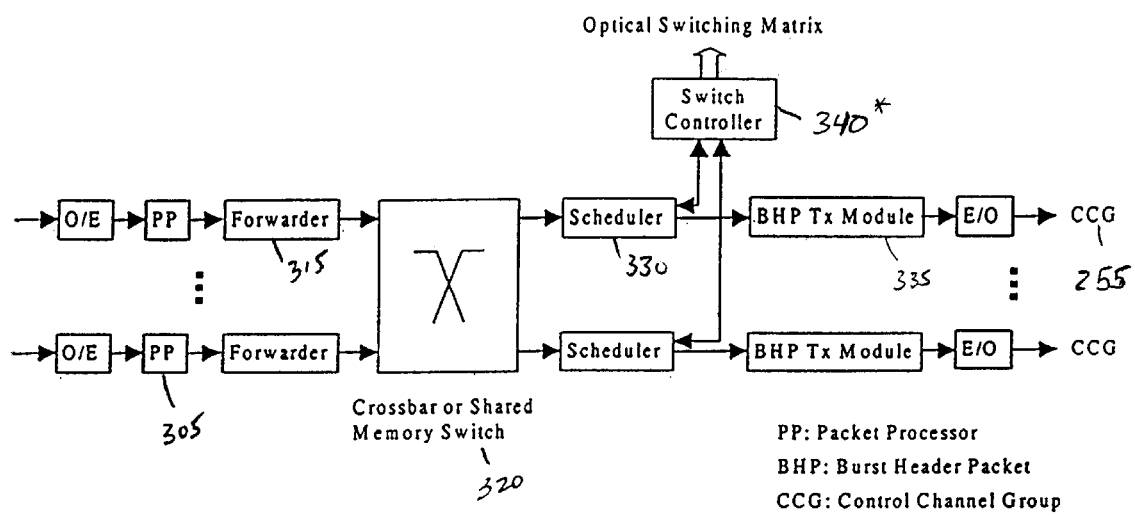
Figure 3: Block diagram of the switch control unit.

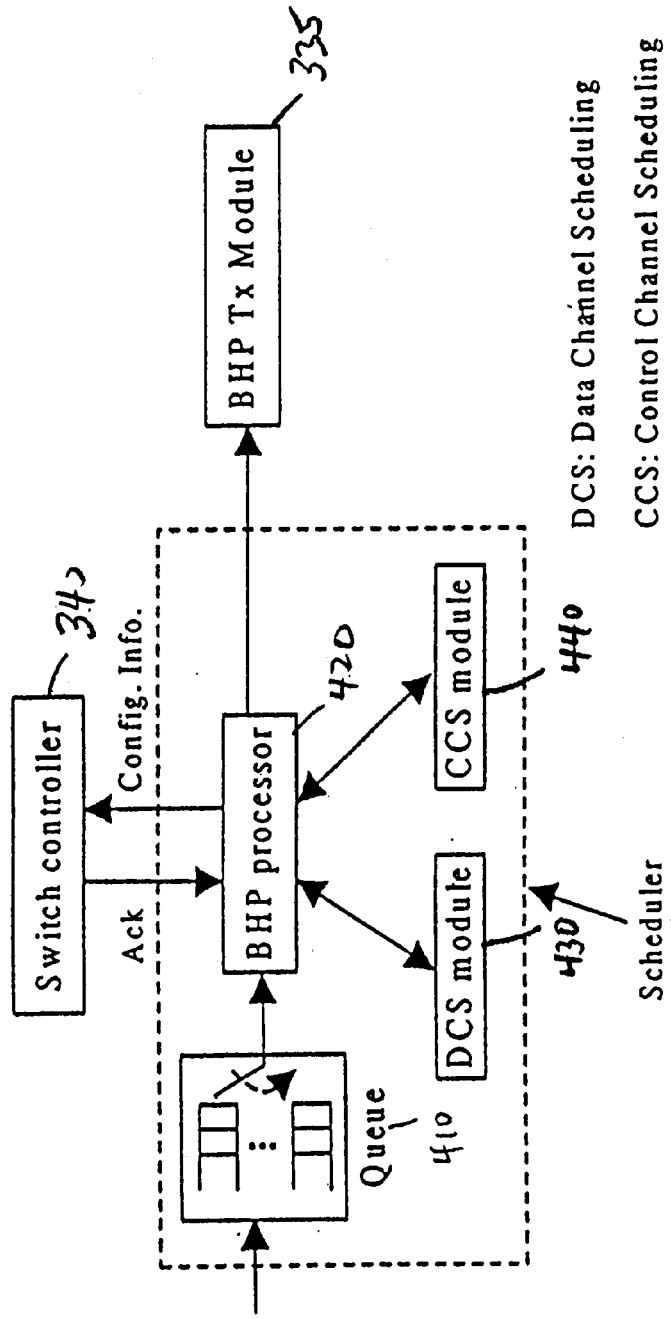
Figure 4: Block diagram of the scheduler.

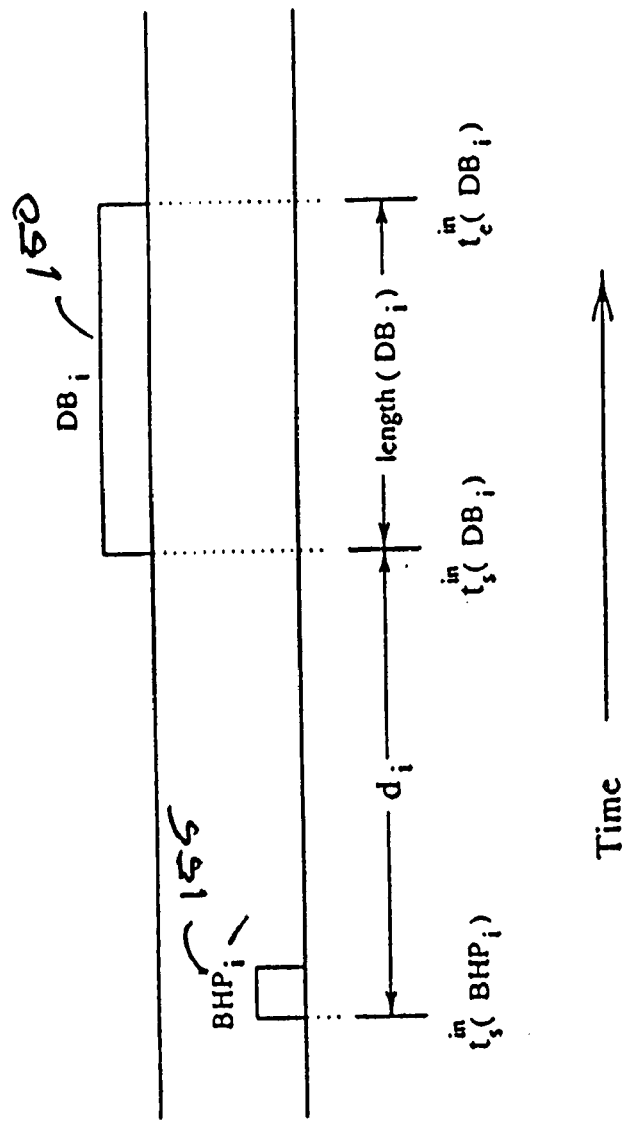
Figure 5: Relation between the receiving times of $BHP_i$ and $DB_i$.

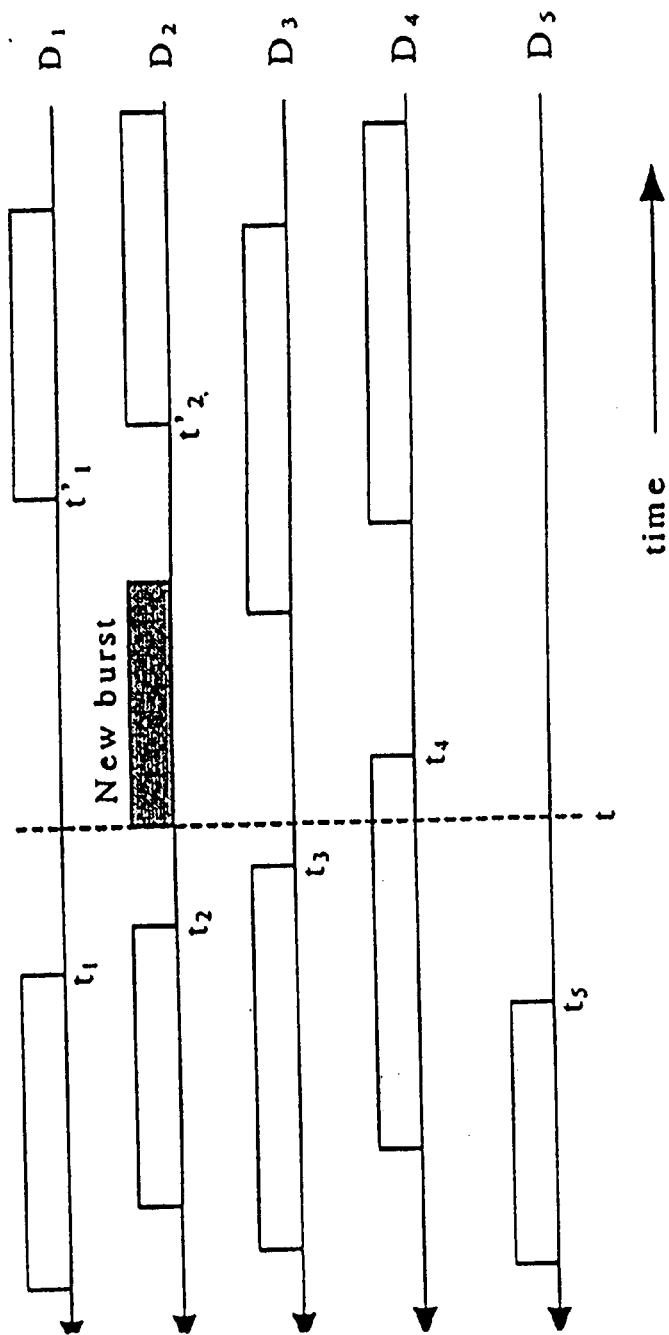
Figure 6: Illustration of the LAUC-VF scheduling algorithm.

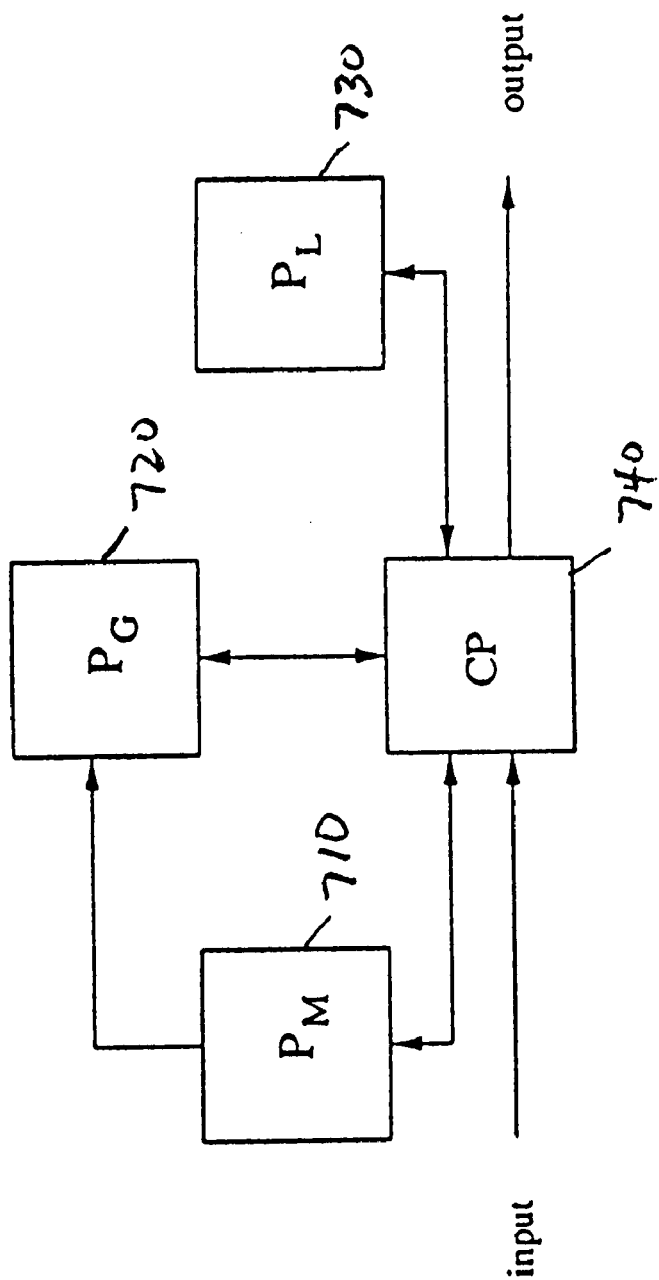
Figure 7: Building blocks of the architecture.

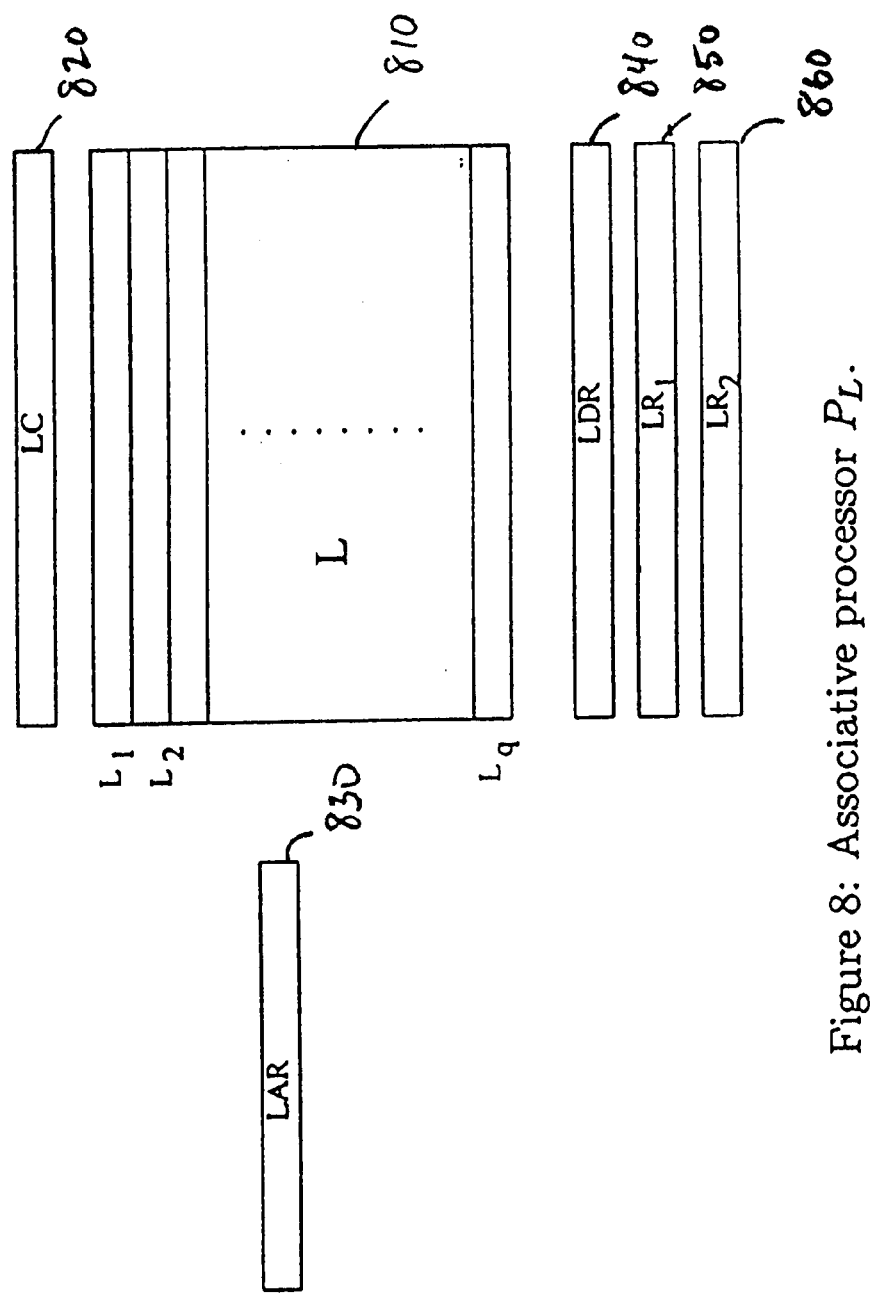
Figure 8: Associative processor $P_L$.

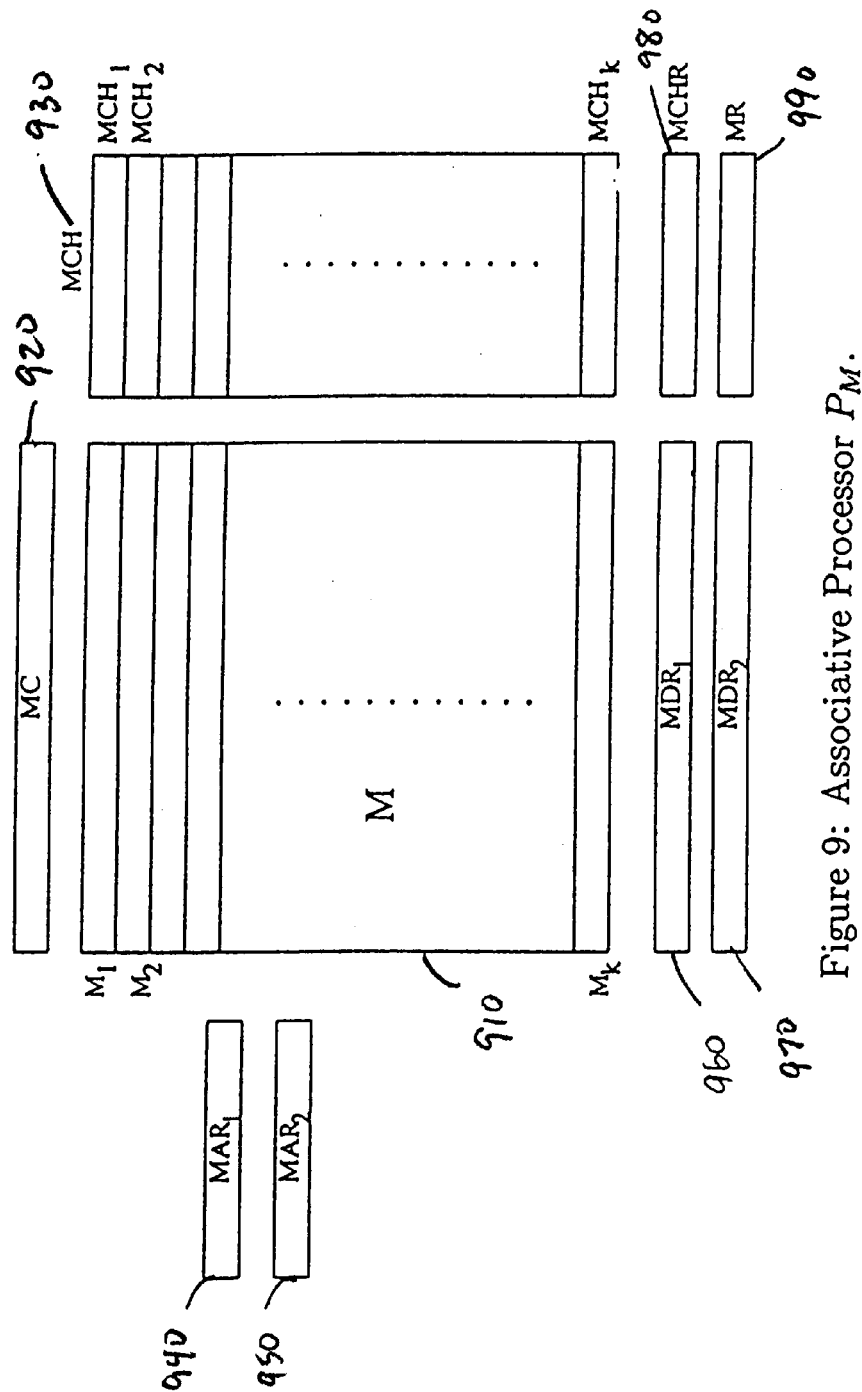
Figure 9: Associative Processor $P_M$.

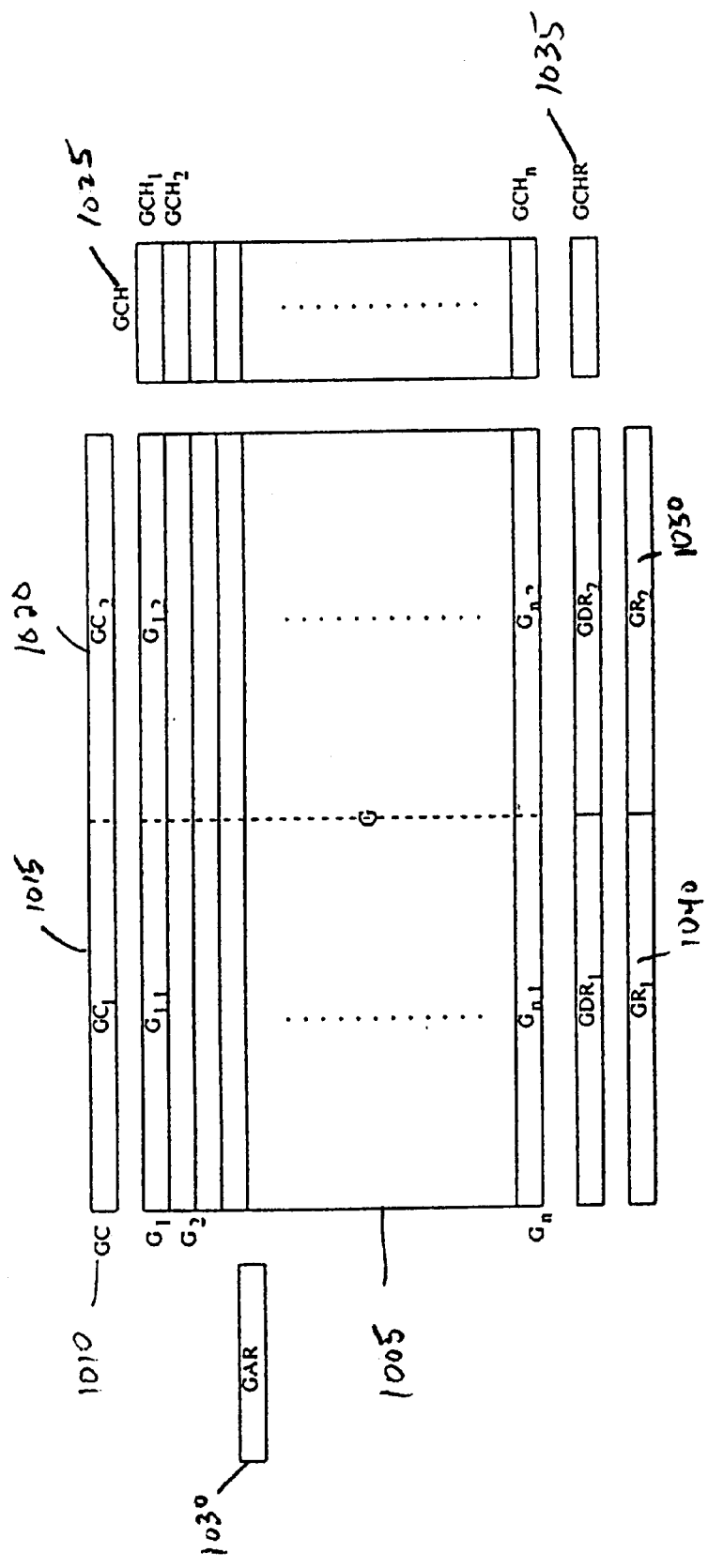
Figure 10: Associative Processor $P_G$.

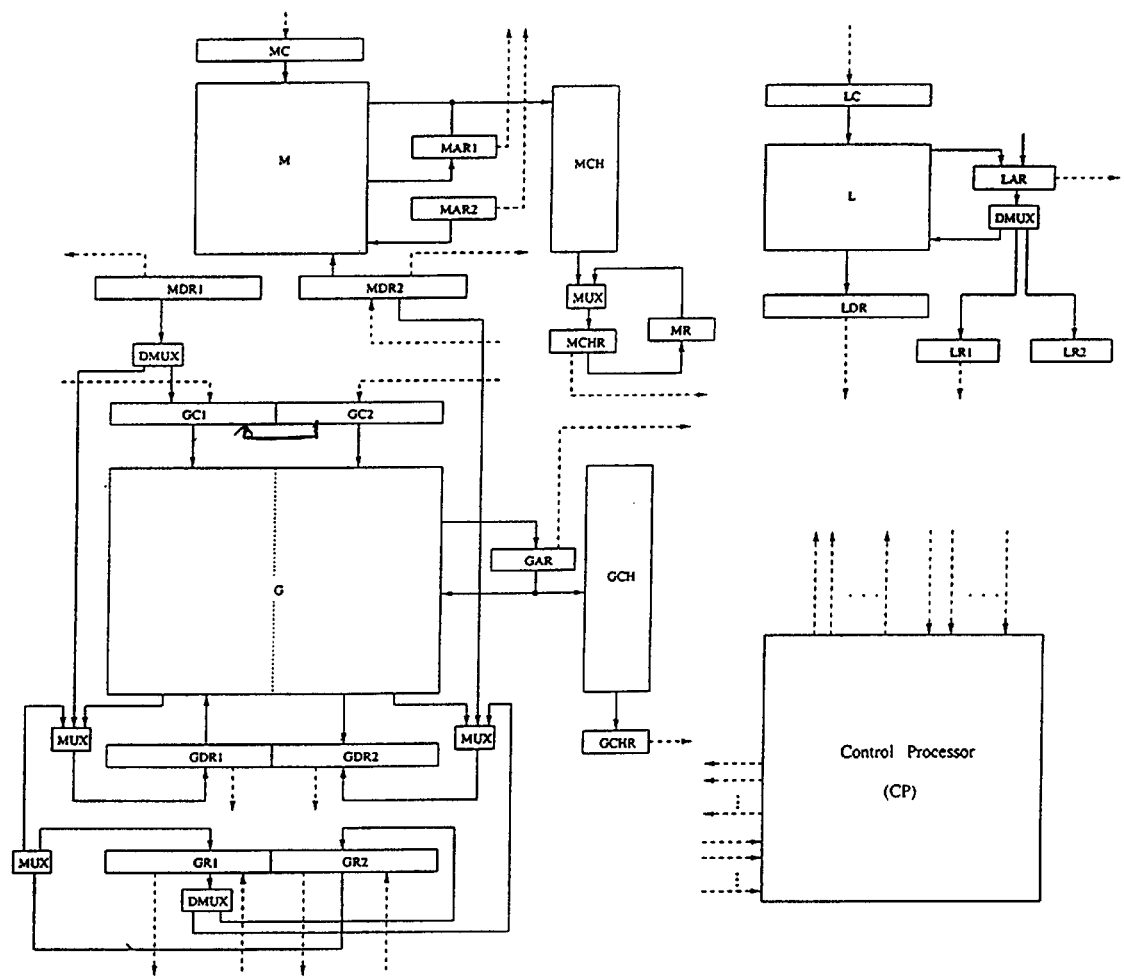
Figure 11: Block diagram of the channel scheduler.

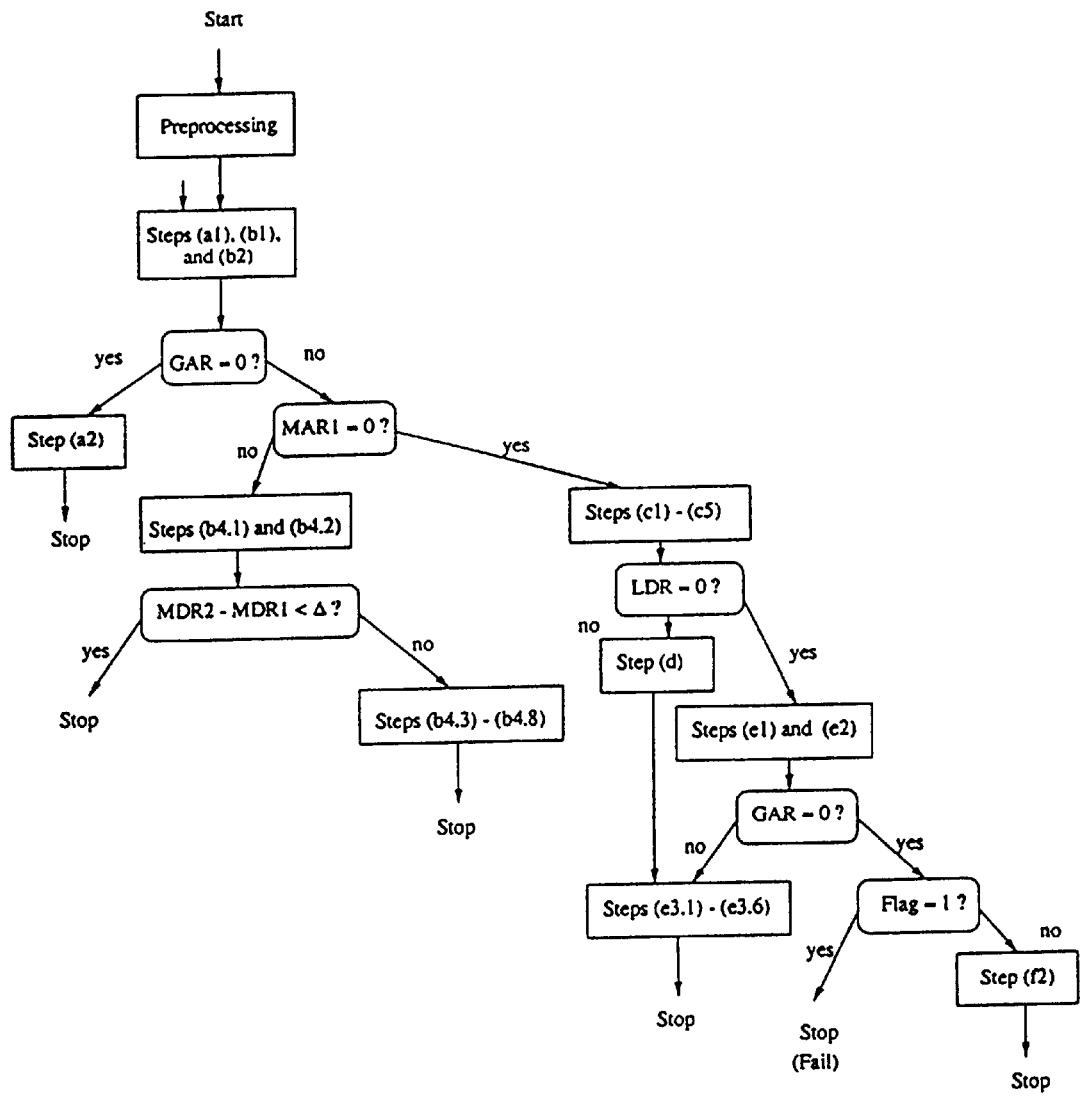
Figure 12: Flow-chart of hardware LAUC-VF algorithm.

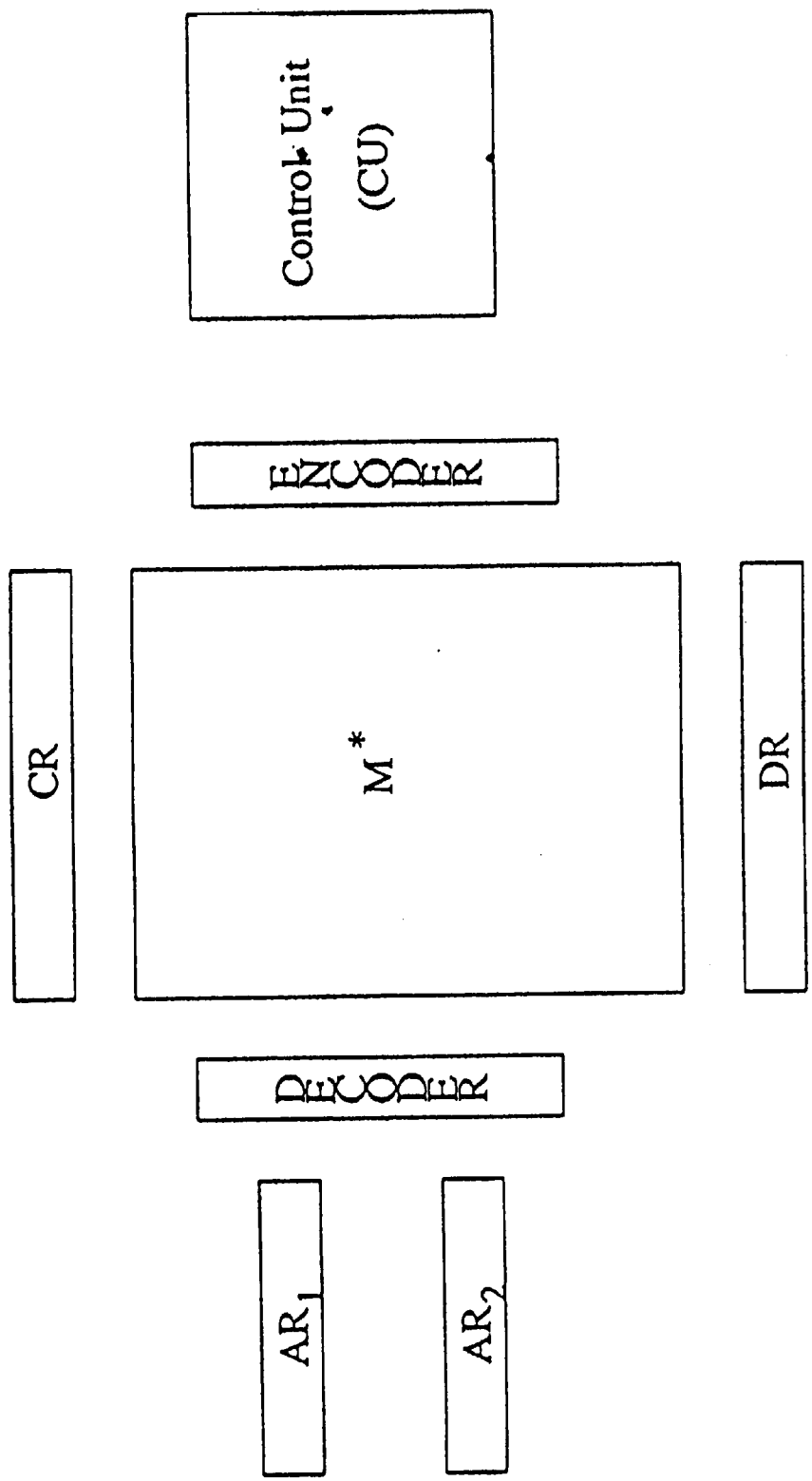
Figure 13: Major components for the associative memory architecture $P_M$.

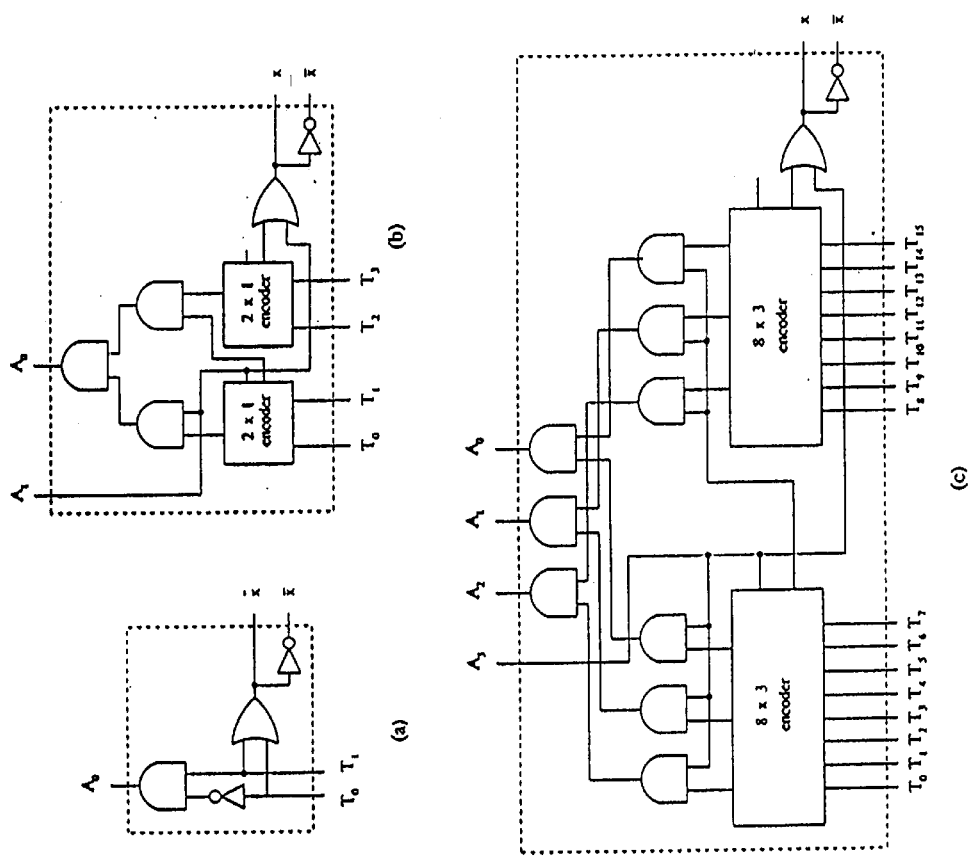
Figure 14: Priority encoders. (a) A $2 \times 1$ $p$-encoder. (b) A $4 \times 2$ $p$-encoder constructed using two copies of the $2 \times 1$ $p$-encoder. (c) A $16 \times 4$ $p$-encoder constructed using two copies of the $8 \times 3$

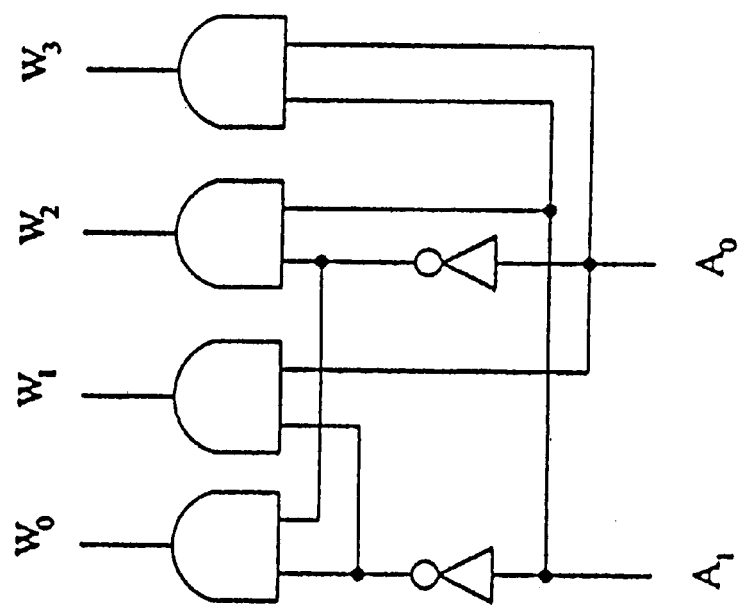
Figure 15: Conventional 2 × 4 decoder.

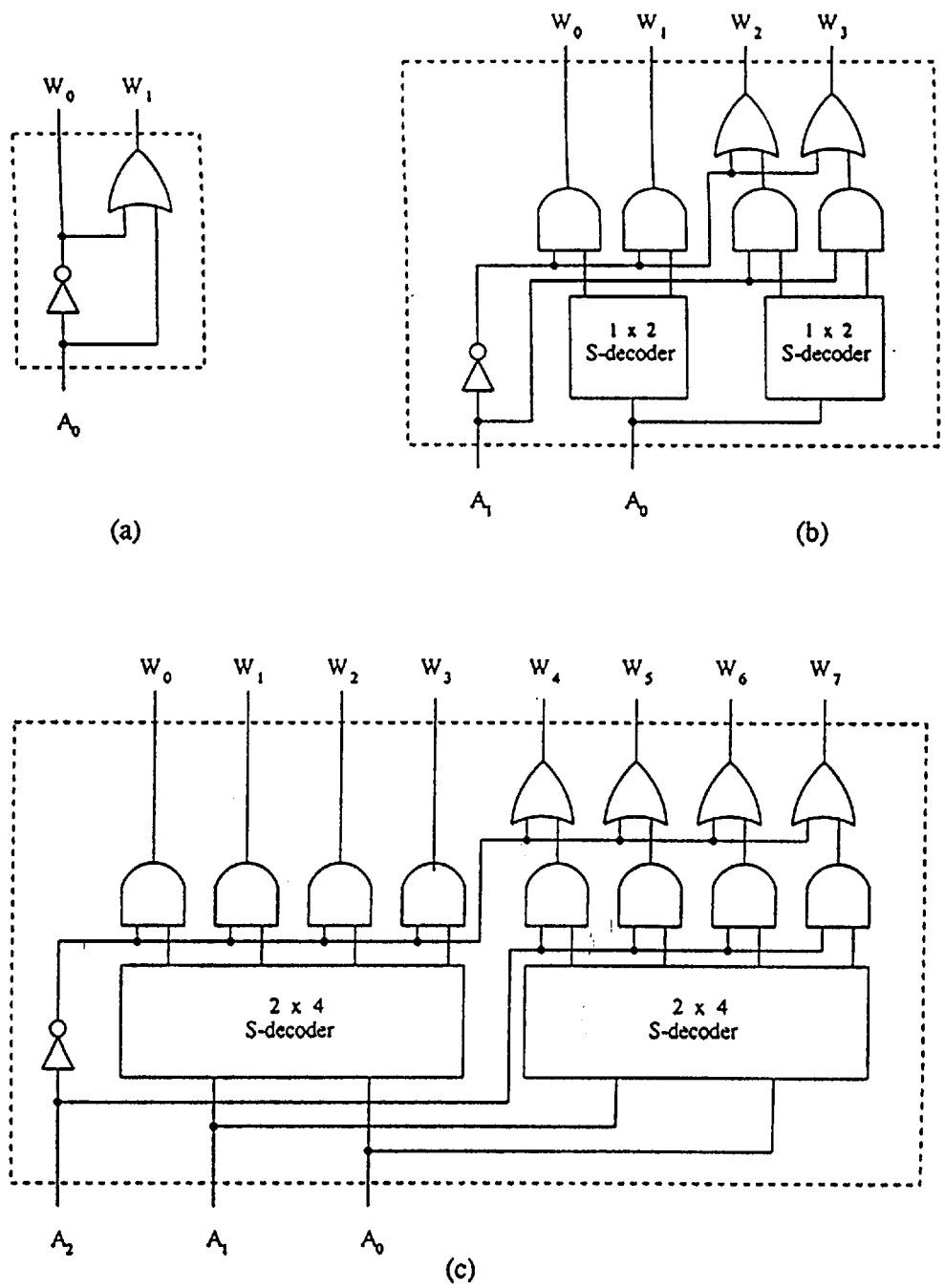
Figure 16: Bipartition decoder.

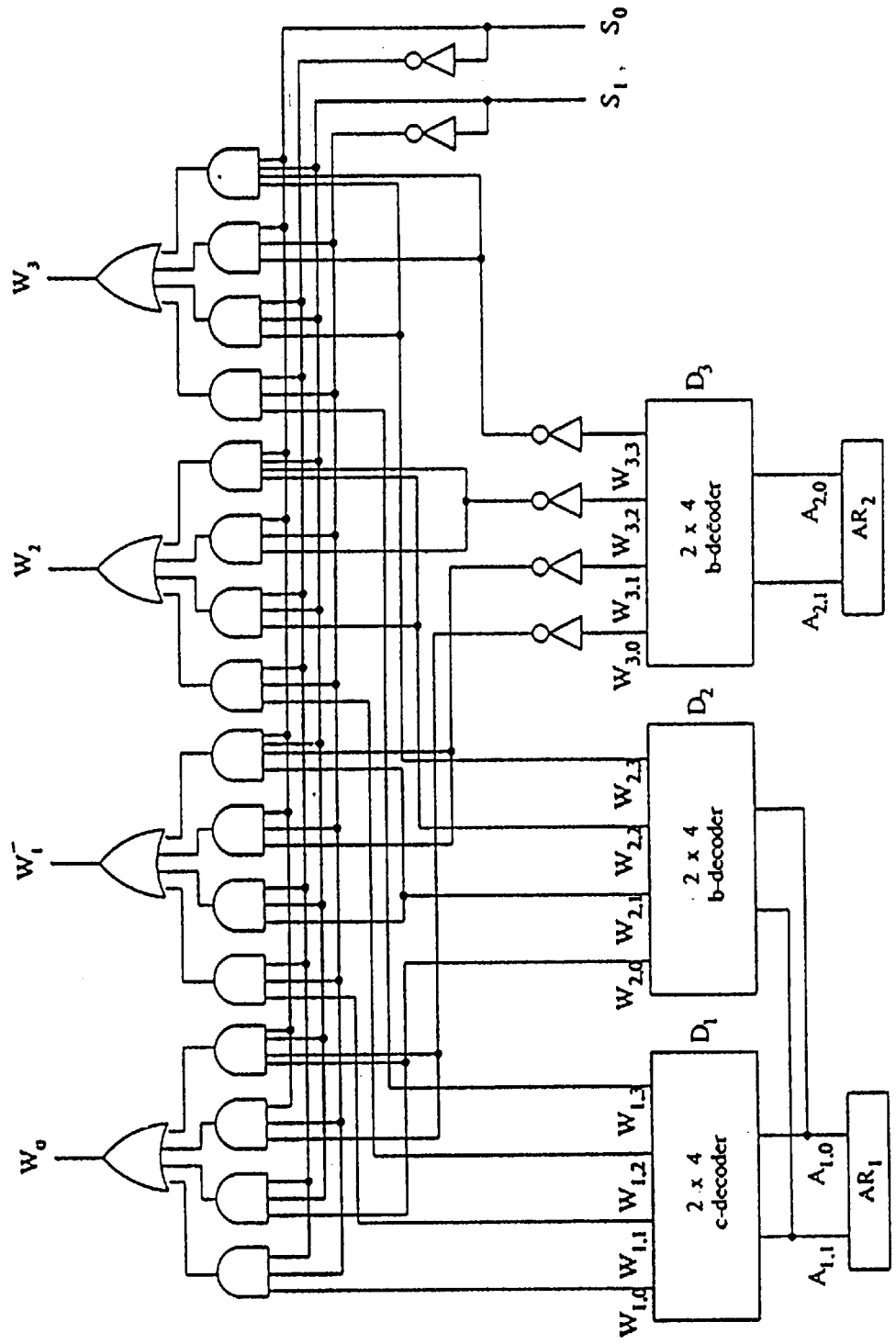
Figure 17: Generalized 4 × 4 decoder.

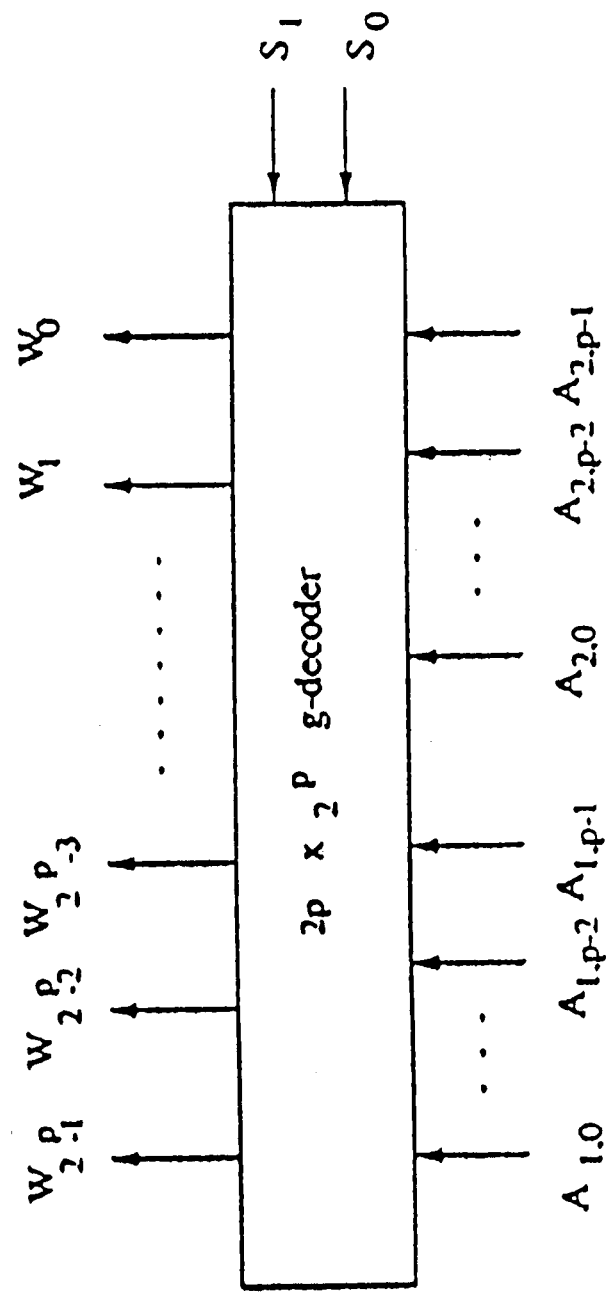
Figure 18: Block diagram of a generalized $p \times 2^p$ decoder.

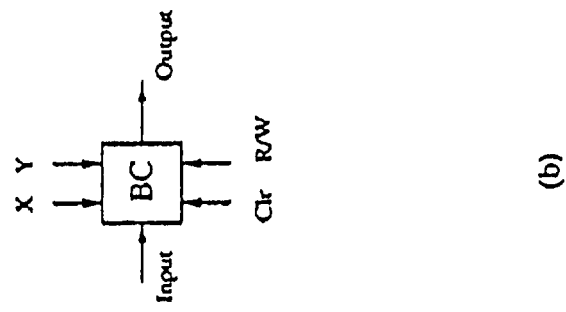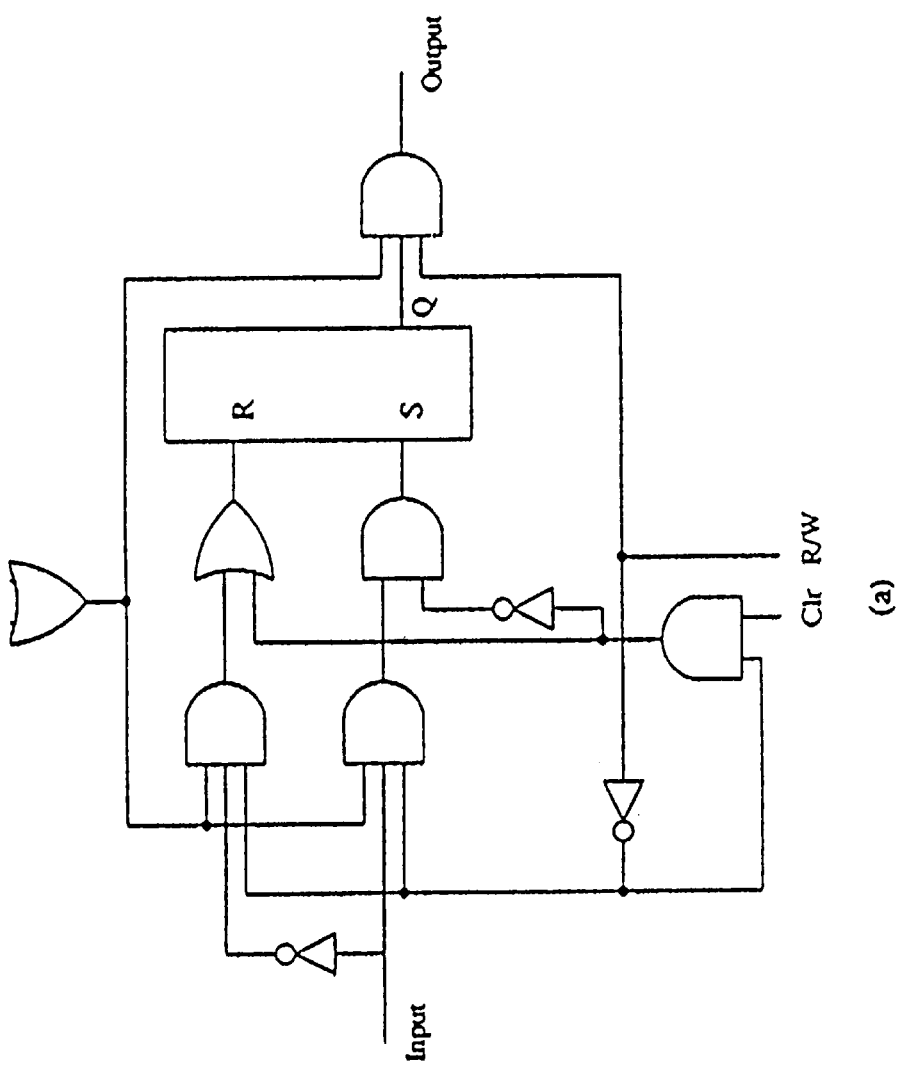
Figure 19: Basic cell. (a) Logic diagram. (b) Block diagram.

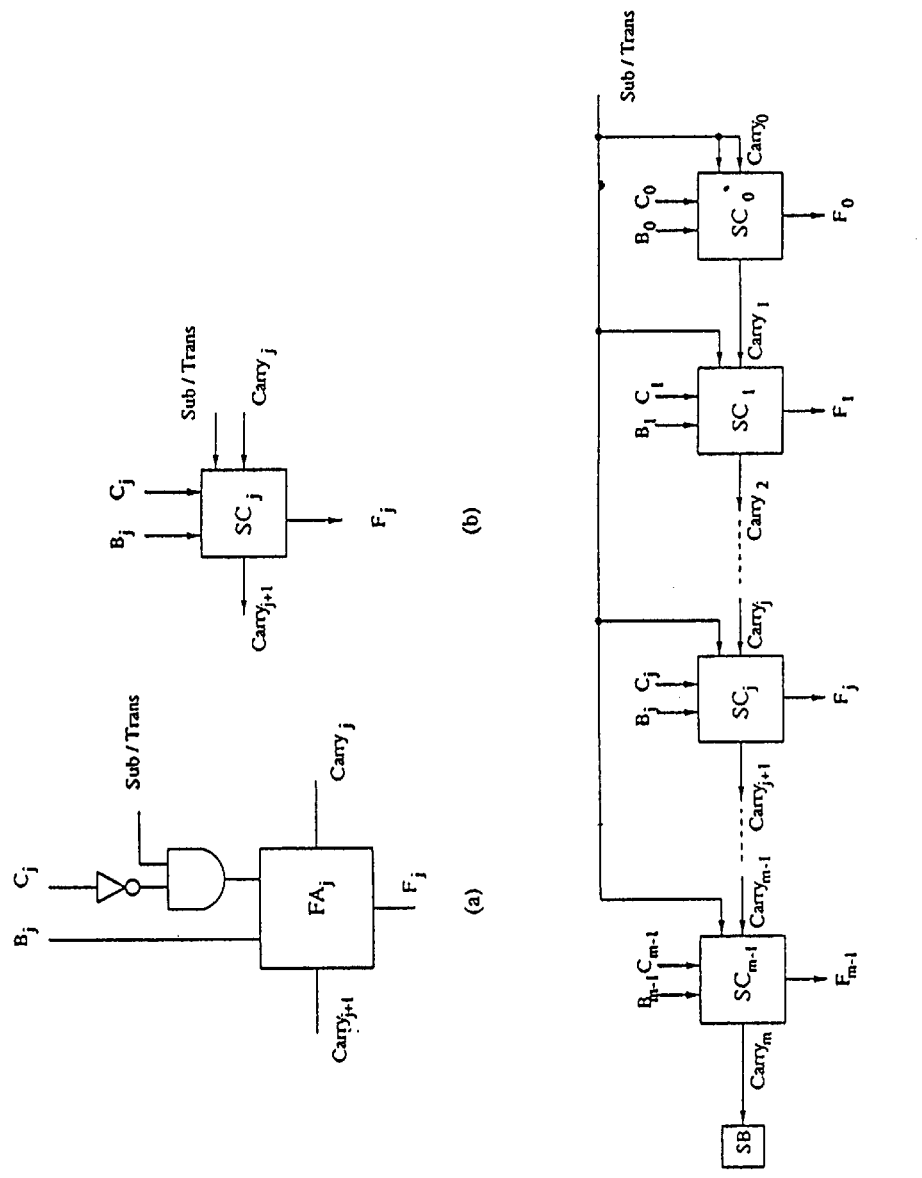
Figure 20: Arithmetic circuit associated with a BC and a word. (a) One subtractor stage $SC$. (b) Block diagram of $SC$. (c) A subtractor constructed with SCs.

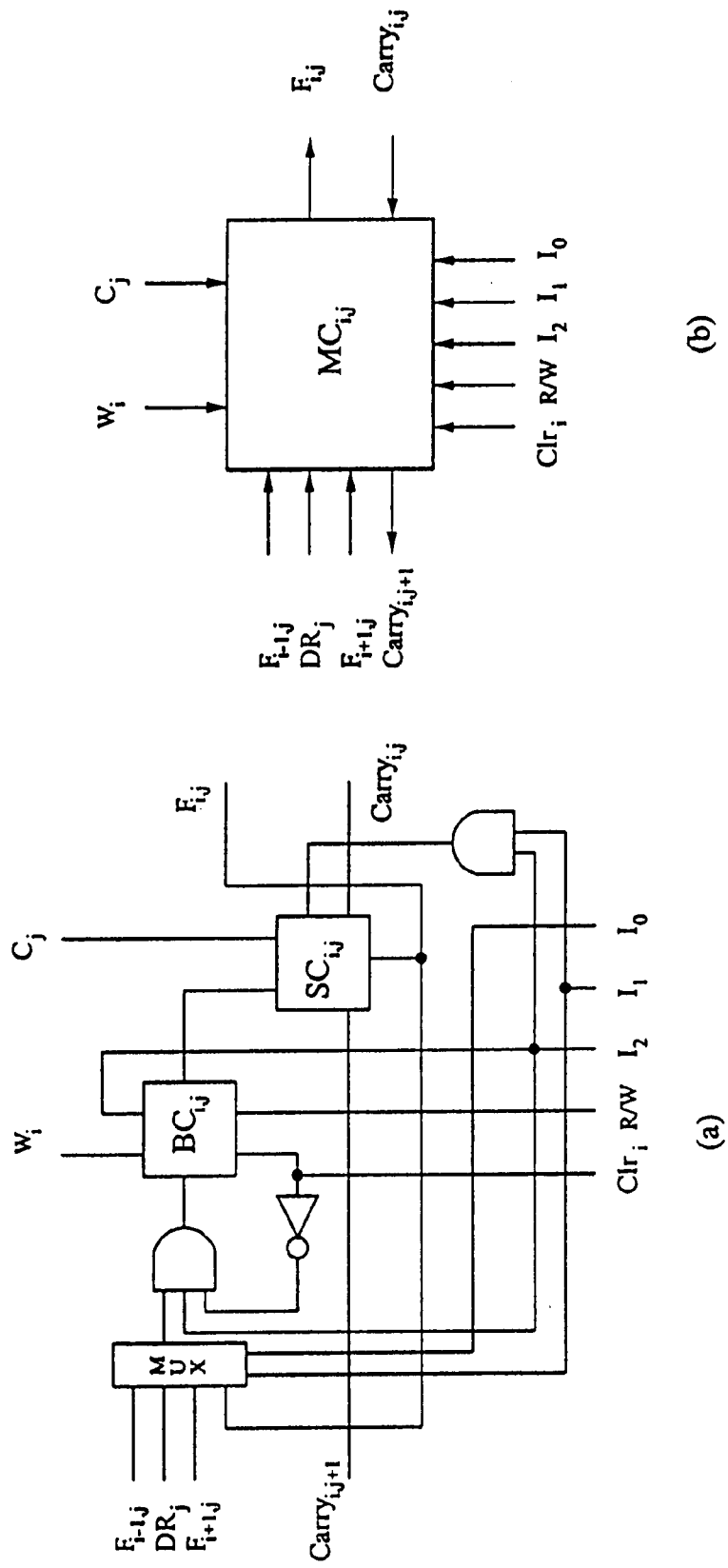
Figure 21: MC.

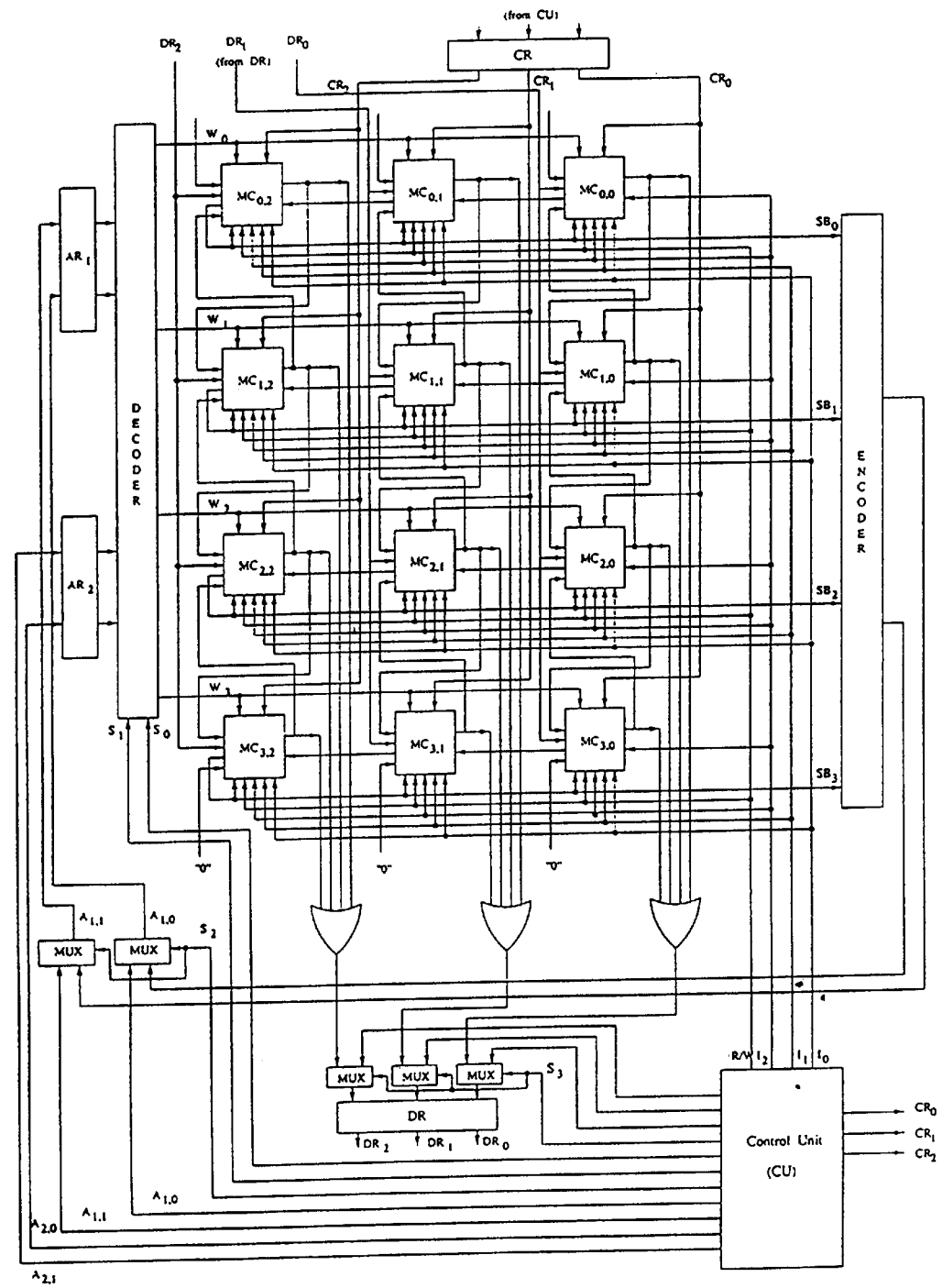
Figure 22: Associative processor $P_M$.

HARDWARE IMPLEMENTATION OF CHANNEL SCHEDULING ALGORITHMS FOR OPTICAL ROUTERS WITH FDL BUFFERS

CROSS REFERENCE TO RELATED APPLICATIONS

This application is related to Ser. No. 09/569,488 filed May 11, 2000, entitled, "All-Optical Networking Optical Fiber Line Delay Buffering Apparatus and Method", which claims the benefit of Ser. No. 60/163,217 filed Nov. 2, 1999, entitled, "All-Optical Networking Optical Fiber Line Delay Buffering Apparatus and Method" and is hereby fully incorporated by reference. This application is also related to Ser. No. 09/409,573 filed Sep. 30, 1999, now U.S. Pat. No. 6,721,315 entitled, Control Architecture in Optical Burst-Switched Networks" and is hereby incorporated by reference.

BACKGROUND OF THE INVENTION

1. Technical Field of the Invention

The present invention relates generally to optical routing and scheduling of data packets, and more specifically to an optical routing and scheduling of data packets employing a void filling algorithm and fiber delay lines (FDLs) as an optical buffer.

2. Discussion of the Related Art

One of the major trends in networking in late 1990's has been a relentless growth in demand for bandwidth in both enterprise and service provider networks. Driving the need for more bandwidth is a combination of factors. More users are connecting as the commercial Internet offers a new online experience for consumers. Internet computing applications, including multi-tier distributed databases, interactive multimedia communication, and electronic commerce rely on the network and demand network resources. A new generation of high-speed Internet access is emerging to meet bandwidth demands and further amplify core bandwidth requirements.

At the same time, competitive pressures make it imperative that networking costs be reduced even as the demand for capacity and new services increases. Successful companies are constantly on the lookout for new technologies which can provide a competitive edge and increase their cost effectiveness.

Optical networking has emerged as a solution to the bandwidth crunch. In particular, one new optical technology—Dense Wavelength Division Multiplexing (DWDM)—promises to increase the capacity and performance of existing fiber optic backbones. DWDM offers a capacity upgrade solution with greater scalability and lower cost than available alternatives.

Wavelength Division Multiplexing (WDM) is a technique for increasing the information-carrying capacity of optical fiber by transmitting multiple signals simultaneously at different wavelengths (or "colors") on the same fiber. In effect, WDM converts a single fiber into multiple "virtual fibers," each driven independently at a different wavelength. Systems with more than a small number of channels (two or three) are considered Dense WDM (DWDM) systems. Nearly all DWDM systems operate across a range of wavelengths in the 1550 nm low-attenuation window.

A DWDM system generally includes optical transmitters (lasers), an optical multiplexer and an demultiplexer, optical amplifiers and optical receivers. DWDM systems use high resolution, or narrowband, lasers transmitting in the 1550 nm wavelength band.

The optical multiplexer combines the transmit signals at different wavelengths onto a single optical fiber, and the demultiplexer separates the combined signal into its component wavelengths at the receiver. Several technologies are currently used for optical multiplexing and demultiplexing, including thin-film dielectric filters and various types of optical gratings. Some (de)multiplexers are constructed as completely passive devices, meaning they require no electrical input. Passive optical (de)multiplexers behave essentially like very high precision prisms to combine and separate individual colors of the WDM signal.

The optical receiver is responsible for detecting an incoming lightwave signal and converting it to an appropriate electronic signal for processing by the receiving device. Optical receivers are very often wideband devices able to detect light over a relatively wide range of wavelengths from about 1280–1580 nm. This is the reason why some seemingly incompatible devices can actually inter-operate. For instance, directly connecting two otherwise compatible network interfaces with different transmitter wavelengths is usually not a problem, even though one end may be transmitting at 1310 nm and the other at 1550 nm.

An additional benefit of the optical amplifier is that as a strictly optical device, it is a protocol- and bit rate-independent device. In other words, an optical amplifier operates the same way regardless of the framing or bit rate of optical signals. This allows a great deal of flexibility in that an optically amplified link can support any combination of protocols (e.g. ATM, SONET, Gigabit Ethernet, PPP) at any bit rate up to a maximum design limit.

With the deployment of DWDM optical fiber transmission systems to accommodate the ever increasing demand for bandwidth, driven by Internet applications, routers/switches are still likely to be the bottleneck of the next generation of Internet backbones. Using the DWDM technology, one can already achieve the transmission capacity of 320 Gbps per fiber commercially. The need for extremely high capacity routers, in the range of one terabits per second (Tbps) and beyond, is expected in the near future.

Optical burst switching (OBS) is an attractive technology in building tera-bit optical routers and realizing the Internet Protocol (IP) over dense wavelength division multiplexing (DWDM). An intrinsic feature of OBS is the separate transmission and switching of data bursts 150 (payload) and their headers 155 (called burst header packets (BHP)) on data and control channels/wavelengths, respectively. Due to the lack of an optical RAM (random access memory), fiber delay lines (FDLs) are used in optical routers to resolve burst conflicts on outbound data channels. In a simplified optical router architecture with N input fibers and N output fibers each fiber has one data channel group (DCG) of (K−1) channels and one control channel group (CCG) of one channel.

For optical routers using FDL buffering, there is a scheduler for each outbound DCG which schedules the arriving data bursts 150 that are to be routed to the same outbound DCG. The scheduler is a key component in the switch control unit. Any channel scheduling algorithm used in the scheduler will directly affect the router performance in terms of throughput and burst loss ratio. The prior art has not produced channel scheduling algorithms capable of providing acceptable throughput and burst loss ratio.

What is needed are sophisticated channel scheduling algorithms incorporating void filling in order to achieve the desired router performance. For any scheduling algorithm with void filling, each scheduler needs to keep track of the busy/idle periods of every data channel of its associated outbound DCG. The scheduler searches for an eligible void/gap when scheduling an arriving data burst. The search has to be done very quickly, e.g., in the range of a few hundred nanoseconds (say 100–300 ns), as the data burst is transmitted at the speed of light. As the number of channels handled by the scheduler increases, so does the complexity of the scheduler.

A scheduler that has to maintain the hardware implementation of a scheduling algorithm with void filling is a technically challenging endeavor, given the stringent real-time requirements and the state information of each data channel.

Various channel scheduling algorithms with and without void filling have been proposed such as the Latest Available Unused Channel (LAUC) algorithm, (also called the Horizon algorithm) and the Latest Available Unused Channel with Void Filling (LAUC-VF) algorithm (and variations on that theme), and other void filling scheduling algorithms. In terms of router performance (burst loss ratio) simulation studies have shown that the LAUC-VF is probably one of the best among all the scheduling algorithms. Despite the studies and the need for such algorithms, no hardware implementation design is available to implement these algorithms.

SUMMARY OF THE INVENTION

Accordingly the present invention provides a scheduling algorithm incorporating void filling and a hardware implementation design capable of implementing the algorithm wherein the desired performance is capable of scheduling a data packet in no more than a few hundred nanoseconds.

The present invention has been made in view of the above circumstances and has as an object to employ a special-purpose parallel processing architecture in the design of the scheduler to meet the stringent real-time requirements. Specifically, the present invention contemplates the use of an associative memory to store the state information of channels and to use associative processor arrays to implement void/gap searches and channel state information updates. The use of the associative processor arrays to implement the channel scheduler provides several advantages. One advantage of the present invention is the state information for a DCG is limited so that an associative memory of a rather small size is adequate. Another advantage is the search and update of the state information of a DCG, which is represented by the relative times of a set of events, is carried out in parallel.

The implementation of the LAUC-VF algorithm or any of the other viable algorithms, requires that the channel state information be frequently updated to reflect the change in time. To solve this problem, the present invention employs the use of relative timing verses absolute timing for representing channel state information. This is achieved by taking a reference point of the relative time, such as at the time the scheduler starts to process a BHP. At each new reference point the state information of all the channels of a DCG are updated simultaneously.

Associative processors $P_G$, $P_M$ and $P_L$ are used to store all the voids, channel unscheduled times and delay times of FDLs, respectively. Search and update functions are also provided and substantially enhance the utility of the algorithm of the present invention. A control processor (CP) coordinates the operations of the processors $P_G$, $P_M$ and $P_L$.

In processor $P_G$, voids are stored in a given order according to their starting times. Similarly, in processors $P_M$ and $P_L$, the channel unscheduled times and delay times of FDLs are also stored in a given order. Searching for a void can easily be performed by one operation called "Parallel Double-Comparand Search". Inserting new voids into the $P_G$ processor is performed by the "Bipartition Shift-Up" and "Bipartition Shift-Down" operations. Processors $P_G$ and $P_M$ are first used together to find the latest available unused channel without using any FDL buffer. In case FDL are used processor $P_L$ will be involved to determine which FDL buffer will be used.

The present invention contemplates the use of a special-purpose parallel processing architecture in the design of schedulers in optical routers, by providing design methodologies for implementing a class of scheduling algorithms with and without void filling.

A further aspect of the present invention is to provide a system for scheduling of data packets in an optical router operating pursuant to an algorithm capable of selecting a suitable outbound channel in real time.

Additional aspects and advantages of the invention will be set forth in part in the description which follows, and in part that will be obvious from the description, or may be learned by practice of the invention. These aspects and advantages of the invention will be realized and attained by means of the elements and combinations particularly pointed out in the appended claims.

To achieve the aspects of the present invention and in accordance with the purpose of the invention, as embodied and broadly described herein, an aspect of the invention can be characterized as a method for implementing channel scheduling algorithms in an optical router, the method including the steps of determining availability of outbound data channels capable of carrying a data packet of duration B and selecting one channel from available data channels. The algorithm further assigns the data packet to the selected channel and updates state information of the selected data channel, wherein if no data channel is available to carry the data packet the data packet is dropped. The algorithm also is capable of determining whether a time delay L can be introduced to shift the arrival time of the data packet via a fiber delay line (FDL), from t to (t+L) to avoid the dropping of the data packet. If such a delay L is available, the algorithm assigns the data packet a delay time equal to L and assign s the appropriate outbound data channel.

The assigning of a channel further includes selecting a fiber and a wavelength from the outbound data channel group to transmit the data packet wherein the data packet may be of a fixed or variable length.

A further aspect of the present invention can be characterized as a system for implementing channel scheduling algorithms in an optical router. The system includes a scheduler, operating pursuant to an algorithm. The scheduler is capable of determining availability of outbound data channels capable of carrying a data packet of duration B and selecting one channel from available data channels. The system then assigns the data packet to the selected channel and updates state information of the selected data channel, but if no data channel is available to carry the data packet the data packet is dropped.

A still further aspect of the invention can be characterized as an apparatus for implementing channel scheduling algorithms in an optical router, the apparatus including means for determining the availability of outbound data channel capable of carrying a data packet of duration B and selecting one channel from the available data channels. The apparatus also includes means for assigning the data packet to the selected channel and means for updating state information of the selected data channel, but if no data channel is available to carry the data packet, the packet is dropped. The means for determining the availability of an outbound channel includes the use of associative processors $P_G$ and $P_M$ to store and search voids/gaps and channel unscheduled time for which a channel is free, respectively. $P_G$ is capable of storing the set of voids/gaps and the corresponding channels and to conduct of parallel search of the set of voids gaps for an available void/gap which is capable of accommodating a data packet. $P_M$ is capable of storing a set of channel unscheduled times from which a channel is free and the corresponding channels and to conduct a parallel search for an available unscheduled time for which a channel is free.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 is a diagram of an optical burst-switched network;

FIG. 2 illustrates a general architecture of an optical router of the present invention;

FIG. 3 is a block diagram of the switch control unit of the present invention;

FIG. 4 is a block diagram of the scheduler of the present invention;

FIG. 5 illustrates relationships between receiving times of a burst header packet (BHP) and a data burst (DB) of the present invention;

FIG. 6 illustrates a Latest Available Unused Channel with Void Filing (LAUC-VF) scheduling algorithm of the present invention;

FIG. 7 illustrates a channel scheduler architecture of the present invention;

FIG. 8 depicts an internal structure of an associate processor $P_L$ of the present invention;

FIG. 9 depicts an internal structure of an associate processor $P_M$ of the present invention;

FIG. 10 depicts an internal structure of an associate processor $P_G$ of the present invention;

FIG. 11 is a block diagram of the channel scheduler of the present invention;

FIG. 12 depicts a flow chart of an implementation of an LAUC-VF algorithm of the present invention;

FIG. 13 shows a block diagram of the associate memory architecture for the $P_M{}^*$ processor of the present invention;

FIG. 14(a) is a logic diagram of a 2×1 p-encoder;

FIG. 14(b) is a logic diagram of a 4×2 p-encoder constructed using two 2×1 p-encoders of FIG. 14(a);

FIG. 14(c) is a logic diagram of a 16×4 p-encoder constructed using two 8×3 p-encoders;

FIG. 15 is a logic diagram of a conventional 2×4 decoder;

FIGS. 16(A), 16(B) and 16(C) are logic diagrams of a Bipartition decoder of the present invention;

FIG. 17 is a logic diagram of a general 4×4 decoder;

FIG. 18 is a block diagram of a generalized p×2P decoder;

FIG. 19(A) depicts a logic diagram of a basic cell of the present invention;

FIG. 19(B) is a block diagram of a basic cell of the present invention;

FIG. 20(A) depicts an arithmetic subtractor stage of the present invention;

FIG. 20(B) is a block diagram of a subtractor cell

FIG. 20(C) depicts an arithmetic circuit associated with every word of the present invention;

FIG. 21 depicts a schematic diagram of a memory cell of the present invention; and FIG. 22 depicts a schematic diagram of the associative processor $P_M{}^*$ of the present invention.

DESCRIPTION OF THE PREFERRED EMBODIMENT

Reference will now be made in detail to the present embodiments along with exemplary embodiments and alternate embodiments of the invention, examples of which are illustrated in the accompanying drawings. Wherever possible, the same reference numbers will be used throughout the drawings to refer to the same or like parts.

In accordance with the invention, the present invention includes a method for implementing channel scheduling algorithms in an optical router, the method includes the steps of determining availability of outbound data channels capable of carrying a data packet of duration B and selecting one channel from available data channels. The algorithm further assigns the data packet to the selected channel and updates state information of the selected data channel, wherein if no data channel is available to carry the data packet the data packet is dropped. The algorithm also is capable of determining whether a time delay L ca introduced to shift the arrival time of the data packet via a fiber delay line (FDL), from t to (t+L) to avoid the dropping of the data packet. If such a delay L is available, the algorithm assigns the data packet a delay time equal to L and assigns the appropriate outbound data channel. Assigning of a channel further includes selecting a fiber and a wavelength from the outbound data channel group to transmit the data packet wherein the data packet may be of a fixed or variable length.

The present invention further includes a system for implementing channel scheduling algorithms in an optical router. The system includes a scheduler, operating pursuant to an algorithm. The scheduler is capable of determining availability of outbound data channels capable of carrying a data packet of duration B and selecting one channel from available data channels. The system then assigns the data packet to the selected channel and updates state information of the selected data channel, but if no data channel is available to carry the data packet the data packet is dropped.

The invention will be further clarified by the following examples, which are intended to be purely exemplary of the invention.

FIG. 1 depicts an optical burst-switched network 100 which includes core routers 105, 106, 107, 108, and 109, electronic edge routers 130, 135 and 140 connected by Dense Wavelength Division Multiplexing (DWDM) links 145. Data bursts (DBs) 150 are transferred by the OBS network 100. A DB 150 is routed to its destination by a header burst packet (BHP) 155, which carries routing information in the form of a data packet.

A general architecture of an optical core router 200, as illustrated in FIG. 2, has N input fibers and M output fibers. The router primarily consists of an optical switching matrix 215 and a switch control unit (SCU) 220.

The optical router 200 also includes routing and signaling processors 225, an input FDL 230 and a FDL buffer 235 deployed by optical switching matrix 215. The FDL buffer 235 can be contained or incorporate within switching matrix 215. The optical router 200 further includes data channel group 240 and control channel group 245 functionality. Channel mapping is used to logically decouple the channels from physical fibers. For example, in FIG. 2, the optical router has L incoming data/control channel groups and L' outgoing data/control channel groups. Note that for each data channel group (DCG), there is an associated control channel group (CCG). A DCG and CCG pair connects two adjacent optical routers, although channels of the DCG/CCG may not be physically carried on the same fiber.

Typically, the router is symmetric with N input and N output fibers, where each fiber has one DCG of (K−1) channels and one CCG of one channel. The data channels are connected to the optical switching matrix 215 and control channels are terminated at the SCU 200.

The routing processor 225 runs routing (and other control) protocols and computes forwarding tables for the SCU 220.

Thus, forwarding of BHPs and their associated DBs can be connectionless or connection-oriented (prior path establishment through signaling). The input fiber delay line (FDL) 230 delays the arriving DBs, thus allowing SCU 220 to have sufficient time to process the associated BHPs and configure optical switching matrix 215 to let DBs fly-through. There is no optical-to-electronic (O/E) and electronic-to-optical (E/O) conversions for DBs 150 in the optical router 220.

A non-blocking optical switching matrix 215 is considered, in which an arriving DB 150 on an inbound data channel can be switched to any idle outbound data channel. FDLs 235 are used as optical buffers to resolve burst contentions on outbound DCGs.

The SCU 220 functions similarly to an electronic router. A block diagram of SCU 220 is shown in FIG. 3, where the packet processor 305 performs layer 1 and layer 2 decapsulation functions and attaches a time-stamp to each arriving BHP 155, which records the arrival time of the associated DB 150 at the optical switching matrix 215. The time-stamp is the sum of the BHP 155 arrival time, the burst offset-time carried by the BHP 155 and the delay introduced by the input FDL 230. Forwarder 315 performs the forwarding table lookup to decide on which outbound CCG to forward the BHP. The associated DB is forwarded to the corresponding DCG. The switch 320 in SCU 220 switches the BHP 155 to the scheduler 330 of the destined outbound CCG. There is a scheduler for each outbound DCG and CCG pair. Its function is to schedule the incoming DBs (and BHPs) to be switched to the same outbound DCG (and CCG). For the non-blocking optical switching matrix 215, each scheduler needs only to keep track of the usage of its associated outbound DCG and CCG. The switch controller 340 configures the optical switching matrix 215 according to the information given by the schedulers. The BHP transmission (Tx) 335 module is responsible for the transmission of BHPs on the outbound CCG 255.

The scheduler 330 is a critical component of SCU 220. FIG. 4 depicts a schematic diagram of building blocks of a scheduler 330. BHPs 155 arriving from switch 320 are first stored in queue 410 and are processed in a predetermined order. A typical example of ordering scheme in queue 410 is a first-in-first-out (FIFO) order, although any order may be utilized with varying results. Virtual queues may also be utilized and maintained for different service classes. Once receiving a BHP 155 from queue 410, the BHP processor 420 extracts information about the DB 150 arrival time at optical switching matrix 215 and the DB 150 duration/length from the BHP. BHP processor 420 then triggers data channel scheduling (DCS) module 430 and control channel scheduling (CCS) module 440. In one embodiment the trigger of the DCS module 430 and the CCS module 440 is performed in a sequential order. The DCS module 430 then finds a free period on one of the outbound data channels to transmit the DB 150 and determines the time required to configure the optical switching matrix 215. A proper FDL buffer 235 is selected, when necessary, to avoid DB transmission conflict on an outbound data channel. Once the DB 150 departure time from the optical switching matrix 215 is determined, the CCS module 440 schedules a time to send the BHP 155 on the outbound CCG. The burst offset-time is primarily employed to resolve any BHP 155 contentions on outbound CCGs. The CCS module 440 is capable of and attempts to resynchronize the DB 150 and its BHP 155 by keeping the new offset time ( ) as close as possible to its initial value $t_0$.

To speedup the scheduling process, in another embodiment of the scheduler 330, the trigger of the DCS module 430 and the CCS module 440 is performed in parallel.

Once scheduling DB 150 and its BHP 155, BHP processor 420 instructs switch controller 340 to configure optical switching matrix 215 accordingly, as depicted in FIG. 3 and FIG. 4. The configuration information sent from the BHP processor 420 to the switch controller 340 includes: (1) incoming DCG identifier and data channel identifier; (2) outgoing DCG identifier and data channel identifier; (3) time to configure; (4) DB duration, and (5) buffer FDL identifier information (i.e. the delay time).

Upon receiving an acknowledgement from the switch controller 340, the BHP processor 420 instructs the DCS and CCS modules to update their state information. It also updates the BHP (e.g., the burst offset-time and data channel identifier field among others) and passes the updated information along with time-to-send BHP information to the BHP Tx module 335. The BHP processor 420 is then ready to process the next BHP.

In the event that either the required delay time for the DB is too long (e.g. larger than the delay that could be provided by the FDL buffer) or the BHP cannot be sent on the outbound CCG with a nonnegative offset time or there is not enough time to process the BHP before the DB enters the optical switching matrix 215, the DB 150 and its BHP 155 are simply discarded. The BHP processor 420 will not process a BHP if its associated DB has already entered the optical switching matrix 215 and has gotten lost (i.e. called early burst arrival phenomenon). To prevent early burst arrivals, the input FDL 230 should be sufficiently long.

For optical routers using fiber delay line (FDL) buffers, DB contentions on an outbound DCG are resolved by delaying the arriving DBs. DBs can however only be delayed for a number of discrete time periods which are proportional to the lengths of FDLs. The storage capacity of the FDL buffers depend on the number of FDLs as well as the length of each FDL. The performance of optical routers in terms of burst loss ratio is determined by not only the storage capacity of FDL buffers but more importantly also by the data channel scheduling algorithm used in the data channel scheduling (DCS) module 430.

Channel scheduling is critical to the design of SCU 220 and it has a critical impact on the router performance. Empirical evidence suggests that using simple scheduling algorithms, like the Latest Available Unscheduled Channel (LAUC) algorithm which is also called Horizon algorithm, and increasing the FDL length leads to a decrease of burst loss ratio, but only to a certain point. A further increasing of the FDL length will adversely affect the router performance because the voids/gaps introduced by the FDL also get larger which decreases the data channel utilization. Therefore, sophisticated scheduling algorithms incorporating void filling has arisen for optical routers with FDL buffering in order to achieve desired performance.

To properly employ void filling, each DCS module 430 has to monitor and track busy/idle periods of its associated outbound data control group (DCG). DCS module 430 searches for an eligible void/gap when scheduling an arriving DB 150. The search has to be done very quickly, e.g., in the range of 100~300 ns, as the DB 150 is traveling at the speed of light. Obviously, the complexity of the DCS module 430 increases as the number of data channels it has to schedule increases. Given the stringent real-time requirements and the state information of each data channel the DCS module 430 has to maintain, the hardware implementation of any scheduling algorithm with void filling, as noted is technically challenging.

The present invention relates to and focuses on the data channel scheduling module 430, also called (data) channel scheduler. The assumptions used in the design of the channel scheduler are as follows:

(1) Each DCG has k data channels that are denoted by $Ch_1, Ch_2, \ldots, Ch_k$. This assumption simplifies the presentation. In reality, different DCGs may have different number of channels;

(2) Each outbound DCG is equipped with a scheduler, which is responsible for scheduling DBs that are switched to the DCG;

(3) The BHPs associated with the DBs to be transmitted on the same outbound DCG are scheduled in the order they are received at the scheduler for that DCG. For simplicity, it is assumed that this is a linear order;

(4) $BHP_i$ includes an offset field $d_i$ that specifies the time between the transmission of the first bit of $BHP_i$ and the first bit of $DB_i$;

(5) $BHP_i$ includes a length field length ($DB_i$) that specifies the length of $DB_i$. Without loss of generality, assume that length ($DB_i$) is quantified in terms of time (if this is not the case, its corresponding time can be determined by the data channel transmission bit rate);

(6) Each $DB_i$ is delayed by the input FDL for a fixed D time before it enters the optical switching matrix 215; and (7) There is a set $S_L$ of q available FDL delay times, $S_L=\{L_1, L_2, \ldots, L_q\}$, that can be selected by the scheduler for DBs to go through the optical switching matrix 215.

Let $t_s^{in}(BHP_i)$ denote the time at which the first bit of $BHP_i$ is received by the switch control unit (SCU), and let $t_s^{in}(DB_i)$ and $t_e^{in}(DB_i)$ denote the receiving time of the first and last bit of $DB_i$ by the input FDL with respect to $t_s^{in}(BHP_i)$, respectively, as shown in FIG. 5. Thus, $$t_s^{in}(DB_i)=t_s^{in}(BHP_i)+d_i \qquad \text{Eq. (1)}$$

and $$t_e^{in}(DB_i)=t_s^{in}(DB_i)+length(DB_i). \qquad \text{Eq. (2)}$$

Let $t_s^{out}(DB_i)$ and $t_e^{out}(DB_i)$ denote the transmitting of $DB_i$ over an outbound data channel. Then, $$t_s^{out}(DB_i)=t_s^{in}(BHP_i)+d_i+D+L_{ri} \qquad \text{Eq. (3)}$$

and $$t_e^{out}(DB_i)=t_s^{out}(DB_i)+length(DB_i). \qquad \text{Eq. (4)}$$

where $L_{ri}$ is an output delay time selected from $S_L''=S_L \{L_0\}$, with $L_0=0$.

Transmitting time interval of $DB_i$ at an optical router is denoted as $[t_s^{out}(DB_i), t_e^{out}DB_i)]$. There is a conflict between $DB_i$ and $DB_j$ if they are transmitted using the same outbound data channel and $$[t_s^{out}(DB_i), t_e^{out}(DB_i)][t_s^{out}(DB_j), t_e^{out}(DB_j)] \; \emptyset.$$

Transmitting time interval of $DB_i$ at an optical router is denoted as $[t_s^{out}(DB_i), t_e^{out}DB_i)]$. There is a conflict between $DB_i$ and $DB_j$ if they are transmitted using the same outbound data channel and $$[t_s^{out}(DB_i), t_e^{out}(DB_i)]\cap[t_s^{out}(DB_j), t_e^{out}(DB_j)]\neq\emptyset.$$

Based on $t_s^{in}(BHP_i)$, $d_i$ and length($DB_i$), $i=1, 2, 3, \ldots$, for the same outbound DCG, assign each $DB_i$ to an outbound data channel $Ch_u$, $1 \leq u \leq k$, and select a delay time $L_{ri}$ from $S_L''$ for $DB_i$ such that there is no conflict between $DB_i$ and $DB_j$, $j \neq i$. Such a channel assignment is called a conflict-free schedule. The scheduling time (decision-making time) for each ($BHP_i$, $DB_i$) pair should be no more than a bounded time.

Due to the real-time constraints, limited lookahead knowledge about future bursts, and the adopted cost/performance trade-off, it may not be always possible to find a conflict-free schedule for all DBs. Thus, the present invention has many alternate embodiments. A relaxed embodiment is to find a conflict-free schedule of a maximum subset of $\{DB_i | i=1, 2, 3, \ldots\}$ in the least possible time, based on $t_s^{in}(BHP_i)$, $d_i$ and length($DB_i$), $i=1, 2, 3, \ldots$, for the same outbound DCG. The DBs that are not scheduled successfully are considered lost.

An analysis of the transmission delay is begun by comparing Eq. (3) with Eq. (1) (respectively, Eq. (4) with Eq. (2)). This comparison reveals that an additional transmission delay $D+L_{ri}$ is introduced at each node. While D is fixed, it is desirable to minimize delay $L_{ri}$ whenever possible.

If it is assumed that the BHPs arrive at the channel scheduler 330 of a tagged outbound DCG, say DCG $\gamma$, are $BHP_i$, (i=1, 2, \ldots, n). Set $S_I(i-1)=\{[t_s^{out}(DB_a), t_e^{out}(DB_a); c_a] | 1 \leq a \leq i-1, 1 \leq c_a \leq k\}$ is used to represent the state of the k channels of the DCG at the time $DB_i$ is being scheduled, where $[t_s^{out}(DB_a), t_e^{out}(DB_a); c_a]$ represents the fact that $DB_a$ is scheduled to be transmitted using data channel $Ch_{c_a}$ of the tagged outbound DCG with starting time $t_s^{out}(DB_a)$ and ending time $t_e^{out}(DB_a)$. Since the scheduling of $DB_a$, $1 \leq a \leq i-1$, is conflict-free, $[t_s^{out}(DB_x), t_e^{out}(DB_x)]\cap[t_s^{out}(DB_y), t_e^{out}(DB_y)]=\emptyset$, for $1 \leq x$, $y \leq i-1$, $x \neq y$ and $c_x=c_y$. By Eq. (3) and Eq. (4), $t_s^{out}(DB_a)=t_s^{in}(BHP_a)+d_a+D+L_{ra}$ and $t_e^{out}(DB_a)=t_s^{in}(BHP_a)+d_a+D+L_{ra}+length(DB_a)$, where $L_{ra}$ is an output FDL delay time selected from $S_L \cup \{L_0\}$, with $L_0=0$. The set $S_I(i-1)$ is called the schedule of all $DB_a$'s such that $a<i$, and its records the time intervals that have so far been used on all channels of the DCG. Using $S_I(i-1)$ two sets are defined, $S_M(i-1)$ and $S_G(i-1)$, which together records all time intervals that are available for future use.

For $1 \leq u \leq k$, $$[S^u_I(i-1)=\{[t_s^{out}(DB_a), t_e^{out}(DB_a); c_a] | [t_s^{out}(DB_a), t_e^{out}(DB_a); c_a]$$
$$\in S_I(i-1) \text{ and } c_a=u\}$$

$$E_u(i-1) =$$
$$\begin{cases} \max\{t_e^{out}(DB_a) | [t_s^{out}(DB_a), t_e^{out}(DB_a); c_a] \in S_I(i-1)\} & \text{if } S^u_I(i-1) \neq 0 \\ 0, & \text{if } S^u_I(i-1) = 0 \end{cases}$$

Clearly, each $E_u(i-1)$ can be used to define a semi-unbounded time interval $[E_u(i-1), \infty)$ on data channel $Ch_u$. $S_M(i-1)=\{[E_u(i-1); u] | 1 \leq u \leq k\}$ is used to characterize the k semi-unbounded intervals for the k data channels.

A gap on an outbound data channel u, represented by $g=[l, r; u]$, is a maximal time interval $[l, r]$ such that there is no DB transmitted on channel u with transmission time that overlaps with $[l, r]$. Clearly, a gap can be of two forms: (i) $g=[0, t_s^{out}(DB_x); u]$, and there does not exist any $[t_s^{out}(DB_y), t_e^{out}(DB_y); u]$ such that $t_s^{out}(DB_y) \leq t_s^{out}(DB_x)$, and (ii) $g=[t_e^{out}(DB_x), t_s^{out}(DB_y); u]$, and there does not exists $[t_s^{out}(DB_z), t_e^{out}(DB_z); u] \in S_I^u(i-1)$ such that either $[t_s^{out}(DB_x), t_e^{out}(DB_x)]\cap[t_s^{out}(DB_z), t_e^{out}(DB_z)] \neq \emptyset$ or $[t_s^{out}(DB_y), t_e^{out}(DB_y)]\cap[t_s^{out}(DB_z), t_e^{out}(DB_z)] \neq \emptyset$. $S_G(i-1)$ is used to denote the set of all gaps defined by schedule $S_I(i-1)$.

The heuristics of the LAUC-VF algorithm will now be described below, with reference to FIG. 6. The basic idea of the LAUC-VF algorithm is to minimize voids/gaps by selecting the latest available unused/unscheduled data channel for each arriving DB.

Given the arrival time t of a DB with duration B to the optical switching matrix 215, the scheduler 330 first finds the outbound data channels that are available for the time period of (t, t+B). If there is at least one such channel, the scheduler selects the latest available channel, i.e., the channel having the smallest gap between t and the end of last DB just before t. In the example shown in FIG. 6, the DCG has 5 channels where $D_1$, $D_2$ and $D_5$ are eligible channels at time t but $D_3$ and $D_4$ are ineligible channels at time t because the void is too small on $D_3$ for the DB and $D_4$ is busy at time t. Data channel $D_2$ is chosen to carry the DB as $t-t_2<t-t_1<t-t_5$. It should be noted that the transmission direction is from right to left. After choosing data channel $D_2$, the state information of $D_2$ needs to be updated since two new voids, $(t_2,t)$ and $(t+B, t_2)$, are created.

In an alternative embodiment, called First Fit with Void Filling (FF-VF), the algorithm is capable of inserting the DB in the first available void or gap found without regard as to whether it was the most efficient or useful gap available. In this embodiment the processing speed may be increased since not all of the available channels need to be searched and no sorting operation as in the LAUC-VF algorithm is required. In this embodiment the channel selection process may always revert back to the first channel in the stack and sequentially check each subsequent channel until a suitable gap is found or the DB is dropped.

In a still further embodiment the scheduling of the search process for locating an available gap in the available channels may follow a round robin process beginning the next search from the point where the previous successful insertion of the DB was preformed. For instance if there are n=5 available channels to select from and the previous available gap was found on n=2 then the next attempt will be at channel n=3 and so on. The channel selection process could also be any predetermined or done randomly until an eligible channel is found or the DB is dropped.

In the case where all the data channels are ineligible at time t, the scheduler will then try to find the outbound data channels that are eligible at time t+$L_1$ (i.e. available for the time period of (t+$L_1$, t+$L_1$+B), and so on. If no data channels are found eligible up to time t+$L_q$, the arriving burst is dropped. For a given time t, the data channels can be classified into unscheduled channels where no bursts are scheduled after t (e.g. $D_5$) and scheduled channels in which some DBs are already scheduled after time t (e.g. $D_1$, $D_2$, $D_3$ and $D_4$). The above LAUC-VF algorithm does not distinguish between scheduled and unscheduled data channels.

An additional embodiment provides the scheduled data channels with higher priorities. For instance, suppose there are two eligible data channels at time t, one scheduled, another unscheduled, the scheduled data channel will be selected to carry the DB. This provides additional capacity and flexibility, since it is not known when and of what length the next DB is. Therefore, by keeping available an untapped channel or an under utilized channel provides capacity that would not be there if it were arbitrarily used.

In a still additional embodiment of the present invention a scheduler does not track all of the gaps/voids in each channel, but instead remembers only one value, the unscheduled time for each channel, from which onwards the channel is free. In this embodiment, one example is the LAUC (Latest Available Unscheduled Channel) algorithm, a degeneration of LAUC-VF algorithm. Another example is the FF (First Fit) algorithm, a degeneration of FF-VF algorithm. Since the calculation of the routing is of such importance, by reducing the number of calculations to be performed the efficiency of the algorithm is enhanced and thus the algorithm may be incorporated into schedulers that need to schedule a DB in a very short time period, e.g., less than 50 nanosecond.

Additional alternative embodiments for void filing scheduling algorithms will now be presented below. The methodologies and techniques used in the alternative embodiments of the LAUC-VF algorithm, are applicable for a wide range of channel scheduling algorithms with and without voiding filling (e.g. the LAUC algorithm, the FF algorithm, the variations of the LAUC-VF algorithm like the FF-VF algorithm).

The basic parameters for these embodiments for the LAUC-VF are as follows:

input: $T_i = t_s^{in}(BHP_i) + d_i + D$, length($DB_i$), $S_M(i-1)$, $S_G(i-1)$, and $S_L$.

output: a channel number and an output delay for $DB_i$, $S_M(i)$ and $S_G(i)$.

The algorithm proceeds through the following steps:

Step (a) Find a gap [l, r; f] in $S_G(i-1)$ such that $T_i > l$ and $T_i$+length($DB_i$)<r. If this operation is not successful then goto Step (b); else do the following:

Assign $DB_i$ to channel $Ch_f$ with $L_{ri}$=0;
if $T_i - l \geq \Delta$ then
$S_G(i) := S_G(i-1) \cup \{[l, T_i; f]\}$
else $S_G(i) := S_G(i-1)$;
if $r - (T_i + length(DB_i)) \geq \Delta$ then
$S_G(i) := S_G(i) \cup \{[T_i + length(DB_i), r; f]\}$;
stop.

Step (b) Find [$E_g$; g] in $S_M(i-1)$ such that $T_i - E_g = \min\{T_i - E_u | T_i - E_u > 0, 1 \leq u \leq k\}$. If this operation is not successful, then go to Step (c); else do the following:

Assign $DB_i$ to channel $Ch_g$ with $L_{ri}$=0;
$S_M(i) := (S_M(i-1) - \{[E_g; g]\}) \cup \{[T_i + length(DB_i); g]\}$;
if $T_i - E_g \geq \Delta$ then
$S_G(i) := S_G(i-1) \cup \{[E_g, T_i; g]\}$;
stop.

Step (c) Find [$E_h$; h] in $S_M(i-1)$ such that $E_h = \min_{1 \leq u \leq k} E_u$, and find $L_a$ in $S_L$ such that $L_a = \min\{L_b | L_b \in S_L, T_i + L_b > E_h\}$. If [$E_h$; h] is not found, goto Step (e).

Step (d) Find [$E_v$; v] in $S_M(i-1)$ such that $T_i + L_a - E_v = \min\{T_i + L_a - E_u | T_i + L_a > E_u, 1 \leq u \leq k\}$.

Step (e) Find $L_p$ in a subset $S_L'$ of $S_L$ and a gap [l, r; w] in $S_G(i-1)$ such that $T_i + L_p > l$ and $T_i + L_p$+length($DB_i$)<r. If this operation is not successful then goto Step (f); else assign $DB_i$ to channel $Ch_w$;

if $T_i + L_p - l \geq \Delta$ then
$S_G(i) := S_G(i-1) \cup \{[l, T_i + L_p; w]\}$
else $S_G(i) := S_G(i-1)$;
$r - (T_i + L_p + length(DB_i)) \geq \Delta$ then
$S_G(i) := S_G(i) \cup \{[T_i + L_p + length(DB_i), r; w]\}$;
stop.

Step (f) if Step (c) is not successful then drop $DB_i$, else do the following operations:

Assign $DB_i$ to channel $Ch_v$ with $L_{ri} = L_a$;
$S_M(i) := (S_M(i-1) - \{[E_v; v]\}) \cup \{[T_i + L_a + length(DB_i); v]\}$;
if $T_i + L_a - E_v \geq \Delta$ then
$S_G(i) := S_G(i-1) \cup \{[E_v, T_i + L_a; v]\}$.
stop.

As shown above, the LAUC-VF algorithm consists of 6 major steps. In Step (a), $S_G(i-1)$ is checked to see if $DB_i$ fits in an available gap which is larger than the threshold gap $\Delta$. If such a gap [l,r;f] is found, $DB_i$ is assigned to channel $Ch_f$, and it will be transmitted without using any delay in $S_L$. This step tries to use the gap to transmit $DB_i$.

If step (a) fails to find a gap, step (b) is performed to search $S_M(i-1)$ for a channel whose semi-unbounded time interval can be used for transmission of $DB_i$ without using any output FDL delay in $S_L$. If the answer is affirmative, $DB_i$ is assigned to such a channel $Ch_f$ that has the largest value in $S_M(i-1)$, and so that no delay in $S_L$ is used. This step implements the LAUC heuristic.

If step (b) fails, the minimum $L_a$ in $S_L$ that allows for scheduling $DB_i$ without using gap filling (void filling) is attempted at step (c). If step (c) is successful, then the LAUC heuristic is applied at step (d) to determine a channel $Ch_v$ so that $L_a$ can be used to avoid void filling. Otherwise, Step (e) is executed.

Regardless of whether the search performed at step (c) is successful or not, control passes to step (e) which executes a test of subset $S_L'$ of $S_L$ to determine if it is possible to use a delay in $S_L'$ and utilize an available gap in $S_G(i-1)$ to transmit $DB_i$ without causing a conflict. If this is possible, the $DB_i$ is assigned to a proper channel $Ch_w$ with a proper delay $L_p$ in the $S_L'$.

If the search performed at step (e) fails but the search performed at step (c) was successful, then $DB_i$ is assigned to channel $Ch_v$ with delay $L_a$ at step (f), as provided for in step (d).

If $L_a$ is not found at step (c), the subset $S_L'$ of $S_L$ is then tested to see if it is possible to use a delay $L_a$ in $S_L'$ and a gap in $S_G(i-1)$. If steps (a), (b), (c) and (e) all fail, the $DB_i$ is dropped.

After the $DB_i$ is scheduled, $S_M$ and $S_G$ are updated. A newly created gap is included into $S_G$ only if its length is not smaller than a constant $\Delta$. Any gap smaller than $\Delta$ is considered of no use for future scheduling.

In an alternative embodiment, let $S_L' = S_L$ at step (e), which means an exhaustive search when necessary. Exhaustive search in $S_L$ can take a lot of time. Thus, a superior approach is to search a proper subset of $S_L$ (the set $S_L$ is the set of FDLs which were defined previously). In another embodiment of the present invention, the number of FDL delays to be searched is limited by a small constant $c_3$, (i.e. $|S_L'| \leq c_3 < |S_L|$. Since the desire is to minimize the number of delays, $L_a$ can be utilized as an upper bound for searching. In case the number of FDLs $|S_L|$ is small (e.g., $|S_L| \leq 4$), a simplified embodiment is just to use Steps (a) and (b) of the above algorithm, wherein it first searches for an eligible channel at time t, if no channel is found, it continues to search for an eligible channel at time $t+L_1$, and so on. If until $t+L_q$, no eligible channel is found, the DB will be dropped.

Maintaining Channel States

As DBs and BHPs are switched in the optical switching matrix 215 and SCU 220 respectively, to maintain a precise relationship between DBs and their associated BHPs is critical for channel scheduling in optical router 200. To achieve this, BHPs are time-stamped upon receipt by the SCU 220. Based on the time-stamp and the offset value of a BHP, the arrival time of its associated DB to the optical switching matrix 215 can be easily calculated. The information used by the lookahead scheduler 330 is the timing information associated with the forthcoming DBs. In the present algorithm LAUC-VF, the timing information is represented by $S_M$ and $S_G$, wherein time is an integer variable. Assuming that the timing is accurate, a critical problem still arises as to how to represent the timing of a event (i.e. relative or absolute time values). Due to the fixed word length capacity of the system, it is desirable to use relative times rather than absolute times.

In the following example, each node (optical router) is assumed to be equipped with a system clock that is synchronized with the input/output (I/O) bit rate. Suppose that operation time returns the current time of the system clock. Upon receiving BHP' at the input of the SCU 220 of the node at time $t_s^{in}(BHP')$, BHP' is time-stamped by the operation timestamp$_{recv}(BHP_i) \leftarrow$ time. At this time, it is not known which outbound CCG and DCG BHP' and DB' will be switched to. BHPs are subject to variable delays from the times they arrive to the SCU 220 to the times they are actually processed by the schedulers. If the DB' associated with BHP' is to be switched to outbound DCG$_\gamma$, the tagged DCG, BHP' will be switched to the scheduler associated with DCG$_\gamma$. Assume that BHP' is BHP$_i$ (consequently, DB' is DB$_i$, the i-th DB to be scheduled by the scheduler of outbound DCG$_\gamma$). Let $t_{sch}$(BHP$_i$) be the time the scheduler starts to process BHP$_i$ (which is BHP'). At this time, BHP$_i$ is time-stamped by the operation timestamp$_{sch}$(BHP$_i$) $\leftarrow$ time.

With respect to time $t_{sch}$(BHP$_i$), it is known that it takes $d_i + D - (t_{sch}(BHP_i) - t_s^{in}(BHP_i))$ additional time for DB$_i$ to enter the optical switching matrix 215. Clearly, any event that occurred before $t_{sch}$(BHP$_i$) has no effect on the scheduling of DB$_i$. Such events can be eliminated from further consideration for scheduling DB$_z$, $z \geq i$. Thus, $S_M(i-1)$ and $S_G(i-1)$ can be updated by deleting the records of those DB transfers occurring before $t_{sch}$(BHP$_i$) when the scheduling of DB$_i$ is being considered.

In this embodiment $t_{sch}(BHP_0) = 0$, and the difference $t_{sch}(BHP_i) - t_{sch}(BHP_i-1)$ is denoted by $t_{interval}(BHP_i)$. The difference $t_{sch}(BHP_i) - t_s^{in}(BHP_i)$ is denoted by $t_{latency}(i)$. Since $t_{latency}(i)$, $t_{interval}(BHP_i)$, $d_i$ and length(DB$_i$) are relative times, we can treat $t_{sch}$(BHP$_i$) as a new time reference point with time 0.

A system counter is employed to timestamp each BHP$_i$. The system counter is a $c_1$-bit circular counter incremented by every pulse of the system clock, wherein $c_1$ is chosen such that $2^{c_1} > t_{latency}(BHP_i)$ for any i. That is, $$2^{c_1} > \max_{i > 0} t_{latency}(BHP_i) \qquad \text{Eq. (5)}$$

Upon receiving BHP$_i$ at the input of the SCU 220 at time $t_s^{in}(BHP_i)$, BHP$_i$ is time-stamped by operation timestamp$_{recv}$(BHP$_i$) $\leftarrow$ time, and at the time $t_{sch}$(BHP$_i$), when the scheduler starts to process BHP$_i$, it is again time-stamped by operation timestamp$_{sch}$(BHP$_i$) $\leftarrow$ time. Based on the timestamps and using $t_{sch}$(BHP$_i$) as a new time reference point of time 0, the arrival time (in terms of system clocks) of DB$_i$ at the optical switching matrix 215 can be calculated from Eq. (6) as follows:

$$T_i' = (\text{timestamp}_{recv}(BHP_i) + d_i + D + 2^{c_1} - \text{timestamp}_{sch}(BHP_i)) \bmod 2^{c_1} \quad \text{Eq. (6)}$$

To calculate $t_{interval}$(BHP$_i$), the scheduler is equiped for outbound DCG$_\gamma$ with two $c_2$-bit counters timer$_0$ and timer$_1$. If timer$_a$, a=0 or 1, starts at time $t_{sch}$(BHP$_{i-1}$) with initial value 0, it is incremented by every pulse of the system clock. It stops counting when either the scheduler for outbound DCG $\gamma$ starts to process the BHP$_i$ (that is, at time $t_{sch}$(BHP$_i$)) or it reaches a value of $2^{c_2}-1$ (i.e. all its bits are 1's), whichever occurs first. When the scheduler starts to process the BHP$_i$, timer$_{\bar{a}}$ starts counting with initial value 0. The two counters count alternatively upon starting to process the BHPs by the scheduler 330. Thus, $t_{interval}$(BHP$_i$)=timer$_a$ in the former case, and $t_{interval}$(BHP$_i$) > $2^{c_2}-1$ in the latter case. The value of $c_2$ can be used to define the "window" size. It is selected to be large enough such that $2^{c_2} > d_i + D + $length(DB$_i$) $- t_{latency}$(BHP$_i$) for any i, as illustrated by Eq.(7).

$$2^{c_2} > \max_{i>0}(d_i + D + L_q + \text{length}(DB_i) - \min_{i>0} t_{latency}(BHP_i)) \quad \text{Eq. (7)}$$

If Eq. (7) is satisfied, DB$_i$ can be assigned to any channel without conflict when $t_{interval}$(BHP$_i$) > $2^{c_2}-1$.

Since D, $L_q$, $\max_{i>0} d_i$ and $\max_{i>0}$ length(DB$_i$) are all constants in a burst-switched WDM network and $t_{latency}$(BHP$_i$) is bounded. Eq. (5) and Eq. (7) indicate that both $c_1$ and $c_2$ can be selected as proper constant values.

The use of relative times not only eliminates the limitation of fixed word size. A number is always represented by a fixed size word (e.g., 2 bytes). If the range of the number is larger, more bits are needed to represent it. For instance, if X ranges from 0 to 7, a word of 3 bits is needed to represent it. If X ranges from 0 to 255, a word of 8 bits is needed to represent it. Therefore, it is desired to keep the range of X small, thus using fewer bits (small size word) to represent it. The use of relative times also reduces the amount of information to be kept for the scheduler 325. Since the new current reference point with respect to BHP$_{i+1}$ has no effect on the scheduling of any DB preceding DB$_{i+1}$, the timing information about any event occurring before the new reference point is no longer useful, and can be excluded from further consideration. More specifically, suppose that two counters timer$_0$ and timer$_1$ operate in the manner described above. At time $t_{sch}$(BHP$_i$), instead of using $S_M(i-1)$ and $S_G(i-1)$, the present invention uses $S''_M(i-1)$ and $S''_G(i-1)$ to make decisions by treating $t_{sch}$(BHP$_i$) as a new reference point with value 0. It is assumed that $S'_M(0) = S_M(0) = \{[0; u] | 1 \leq u \leq k\}$ and $S'_G(0) = S_G(0) = \emptyset$. When BHP$_i$ is considered for the scheduling of $DB_i$, the present invention constructs $S''_M(i-1)$ and $S''_G(i-1)$ from $S'_M(i-1)$ and $S'_G(i-1)$ as follows:

$$S''_M(i-1) = \{[e''; u] | [e'; u] \in S'_M(i-1)\} \qquad \text{Eq. (8)}$$

where $$e'' = \begin{cases} e' - timer_a, & \text{if } e' > timer_a \\ 0, & \text{otherwise} \end{cases} \qquad \text{Eq. (9)}$$

For every $[l', r'; u] \in S'_G(i-1)$, obtain $[l'', r''; u]$ such that $$l'' = \begin{cases} l' - timer_a, & \text{if } l' > timer_a \\ 0, & \text{otherwise} \end{cases} \qquad \text{Eq. (10)}$$

and $$r'' = \begin{cases} r' - timer_a, & \text{if } r' > timer_a \\ 0, & \text{otherwise} \end{cases} \qquad \text{Eq. (11)}$$

Let $$S''_G(i-1) := \{[l'',r'';u] | [l',r';u] \in S'_G(i-1), l'' \neq 0 \text{ and } r'' \neq 0\} \qquad \text{Eq. (12)}$$

After the $DB_i$ is scheduled, $S''_M(i-1)$ and $S''_G(i-1)$ are updated to obtain $S'_M(i)$ and $S'_G(i)$, respectively, using $t_{sch}(BHP_i)$ as the reference point. Theoretically, $|S''_G(i-1)| \leq |S'_G(i-1)| \leq |S_G(i-1)|$, and $|S''_G(i-1)|$ is a function of $\max_{i>0}(d_i+D+L_q)$; it is no larger than a constant since $\max_{i>0}(d_i+D+L_q)$ is upper-bounded by a constant. The use of $\Delta$, which is a constant threshold which is selected to exclude gaps that are smaller than the constant threshold, for filtering out small gaps further reduces the size of the set of gaps to be maintained. If $length_{min}(DB)$ is the minimum length of the data burst (note: $\Delta > length_{min}(DB)$), a loose upper bound of size $S'_G$ is obtained by $$|S'_G| < k[x] \qquad \text{Eq. (13)}$$

where $x = \max_{i>0}(d_i+D+L_q)/(length_{min}(DB)+\Delta)$.

Channel Scheduler Architecture

Using relative times to implement the LAUC-VF scheduling algorithm requires all relevant timing information to be updated at every new reference point, as indicated in Eqs. (9), (10), and (11). It contradicts the objective of channel scheduling if the states of all channels are stored in a conventional random access memory (RAM) since accessing RAM sequentially consumes too much time. Parallel processing is inevitable even as computing speed increases.

One aspect of the present invention contemplates use of associative memory to store the state information of channels. An associative memory (AM) allows parallel access of multiple memory words. It is also called a content-addressable memory (CAM). Data stored in an associative memory are addressed by their contents. The advantages of an AM include its parallel accessing power and its regular structure suitable for VLSI implementation. The major disadvantages of an AM are its limited scalability and high cost.

For parallel processing, each word is associated in an associative memory with a simple arithmetic circuit. Each AM word and its associated logic circuit form a processing element. All processing elements are capable of operating in parallel (simultaneously) under the same instruction. Such a parallel processing structure is called an associative processor, and it belongs to the class of Single Instruction Stream Multiple Data Streams (SIMD) parallel architectures.

The present channel scheduler repeatedly performs search operations of the form "find the smallest element a in a set S such that a<b, where b is a given comparand". To facilitate such operations, information stored in an associative memory needs to be maintained in sorted order, although the sorting may undertake a variety of formats. The simplest sorting architecture is a linear array. Insertion, deletion and shift are basic operations of a linear array for maintaining sorted order. Thus, it is proposed to connect the words in an associative memory as a linear array. Although a linear array is suggested, multidimensional or hierarchical arrays may be employed.

The associative processor arrays is preferred, although the present invention is not limited to this aspect, to implement the channel scheduler because (a) the state information for a data channel group (DCG) is limited so that an AM of a rather small size is adequate, and (b) the searching and updating of the state of a DCG, which is represented by the relative times of a set of events, must be carried out in parallel.

This is because, typically a single processor with a random access memory cannot be used for a channel scheduler due to the stringent real-time requirement. A single processor processes data in a sequential fashion. Data items stored in a conventional random access memory are accessed sequentially. The low speed of such sequential processing cannot satisfy the stringent real-time constraints of channel scheduling.

FIG. 7 illustrates the structure of the special purpose architecture of the present invention that implements the LAUC-VF algorithm for a DCG, for instance DCGγ. The input is $T_i'$ (given by Eq. (6)) and length($BD_i$) and the output is a channel number and an output FDL delay value for $DB_i$. There are four building blocks: associative processors $P_M$ 710, $P_G$ 720 and $P_L$ 730 for operations related to $S_M$, $S_G$ and $S_L$, respectively, and a control processor (CP) 740 for coordinating the operations of $P_M$ 710, $P_G$ 720 and $P_L$ 730.

The control processor 740 includes a simple arithmetic-logic unit (ALU) (not shown), which can be used to perform addition, subtraction and comparison operations. The ALU generates all control signals for the operations of $P_M$ 710, $P_G$ 720 and $P_L$ 730. The ALU takes the relative arrival time $T_i'$ (see Eq. (6)) and burst length($BD_i$) as inputs, and produces a channel number and a delay value $L_{ri}$ for the $DB_i$.

The structure of $P_L$ 730 is illustrated in FIG. 8 and will now be discussed. L 810 is an associative memory of q words, $L_1, L_2, \ldots, L_q$ for q delay values in $S_L$. It is assumed that $L_1 < L_2 < \ldots < L_q$ and each word is associated with a simple subtraction circuit. LC 820 is a comparand register and holds the operand to be compared with the values stored in L 810. LAR 830 is an address register for L 810. LDR 840 is a data register for L 810, wherein $LR_1$ 850 and $LR_2$ 860 operate as working registers for L 810.

Two operations are defined for $P_L$:

RANDOM READ: Given an address x in LAR 830, read $L_x$ into LDR 840.

PARALLEL SEARCH: Given a value x in LC 820, find the smallest y such that $L_y \geq x$, and do $LDR \leftarrow L_y$, and $LAR \leftarrow y$. If there is no such entry $L_y$, set $LAR=0$.

Associative Processor $P_M$ architecture, as illustrated in FIG. 9, will now be discussed in detail. M 910 is an associative memory of k words, $M_1, M_2, \ldots M_k$ (i.e. one for each channel of the data channel group). Each word is associated with a simple subtraction circuit for subtraction and compare operations. The words are also connected as a linear array. MC 920 is a comparand register that holds the operand to be compared with. MCH 930 is a memory of k words, $MCH_1, MCH_2, \ldots, MCH_k$, with $MCH_j$ corresponding to $M_j$. The words are connected as a linear array, and they are used to store the channel numbers. MAR$_1$ 940 and MAR$_2$ 950 are address registers used to hold addresses for accessing M 910 and MCH 930. MDR$_1$ 960, MDR$_2$ 970 and MCHR 980 are data registers. Together with MARs, they are used to access M 910 and MCH 930. MR 990 is a working register and is employed to contain temporary data that would otherwise be lost before it is reused. Note that a pair of memory words [M$_i$; MCH$_i$], corresponds to an [E$_j$; u] in S$_M$.

Five operations are defined for P$_M$:

PARALLEL SUBTRACTION: For all words M$_j$, $1 \leq j \leq k$, do in parallel:

$$M_j \leftarrow \begin{cases} M_j - MC, & \text{if } M_j > MC \\ 0, & \text{otherwise} \end{cases}$$

RANDOM READ: Given address x in MAR$_1$, do MDR$_1 \leftarrow$ M$_x$, MCHR$\leftarrow$MCH$_x$.

RANDOM WRITE: Given address x in MAR$_1$, do M$_x \leftarrow$MDR$_2$, MCH$_x$77 MCHR.

PARALLEL SEARCH: The value of MC is compared with the values of all words M$_1$, M$_2$, ..., M$_k$ simultaneously (in parallel). Find the smallest j such that M$_j$<MC, and do MAR$_1\leftarrow$j, MDR$_1\leftarrow$M$_j$, and MCHR$\leftarrow$MCH$_j$. If there does not exist any word M$_j$ such that M$_j$<MC, MAR$_1$=0 after this operation.

SEGMENT SHIFT-DOWN: If there does not exist any word M$_j$ such that M$_j$<MC, MAR$_1$=0 after this operation.

SEGMENT SHIFT-DOWN: Given addresses a in MAR$_1$ 940, and b in MAR$_2$ 950, such that a<b, perform M$_j$+1$\leftarrow$M$_j$ and MCH$_j$+1$\leftarrow$MCH$_j$ for all $a-1 \leq j < b$.

It should be noted that for RANDOM READ, RANDOM WRITE and SEGMENT SHIFT-DOWN operations, each pair (M$_j$, MCH$_j$) is treated as a superword. For simplicity, READ M and WRITE M are used to refer to RANDOM READ and WRITE operation, respectively.

The structure of associative processor P$_G$ 720, will now be described with reference to FIG. 10. G 1005 is an associative memory of n superwords, G$_1$, G$_2$, ..., G$_n$, with each G$_i$ consisting of two words G$_{i,1}$ and G$_{i,2}$, which are called the first and second words of G$_i$, respectively. Each word is associated with a simple subtraction circuit for subtraction and compare operations. The superwords are also connected as a linear array.

GC 1010 is a comparand register and holds a superword of two words, GC$_1$ 1015 and GC$_2$ 1020, which are the first and the second words of GC 1010, respectively. In a parallel compare operation, either GC$_1$ 1015 is compared with all the first words of G 1005 and GC$_2$ 1020 is compared with all the second words of G 1005, or only GC$_1$ 1015 is compared with all the first words of G 1005. In the latter case, GC$_2$ 1020 is masked out for the operation. GCH 1025 is a memory of n words, GCH$_1$, GCH$_2$, ..., GCH$_n$, with GCH$_j$ corresponding to G$_j$. The words are connected as a linear array and they are used to store channel numbers. GAR 1030 is an address register used to store address of a superword of G 1005 to be read or written. GDR is comprised of GDR1 and GDR2 and it is a data register for G. GCHR 1035 is a data register. GAR 1030, GDR and GCHR together are used to access G 1005 and GCH 1025. GR$_1$ 1040 and GR$_2$ 1050 are working registers.

Six operations are defined for P$_G$:

RANDOM WRITE: Given address x in GAR 1030, do G$_x$, 1 GDR$_1$, G$_x$, 2 GDR$_2$, GCH$_x$ GCHR.

PARALLEL SUBTRACTION: For all words G$_j$, $1 \leq j \leq n$, do in parallel:

$$G_{j,1} \leftarrow \begin{cases} G_{j,1} - GC_1, & \text{if } G_{j,1} > GC_1 \\ 0, & \text{otherwise} \end{cases}$$

$$G_{j,2} \leftarrow \begin{cases} G_{j,2} - GC_2, & \text{if } G_{j,2} > GC_2 \\ 0, & \text{otherwise} \end{cases}$$

PARALLEL DOUBLE-COMPARAND SEARCH: The value of GC 1010 is compared with the values of all superwords G$_1$, G$_2$, ..., G$_n$ simultaneously (i.e. in parallel). Find the smallest j such that GC$_1$>G$_{j,1}$ and GC$_2$<G$_{j,2}$. If this operation is successful, then do GDR$_1$ G$_{j,1}$, GDR$_2$ G$_{j,2}$, GCHR GCHj, and GAR j; otherwise, GAR 0.

PARALLEL SINGLE-COMPARAND SEARCH: The value of GC$_1$ is compared with the values of all words G$_1$, G$_2$, ..., G$_n$ simultaneously (i.e. in parallel). Find the smallest j such that G$_{j,1}$>GC$_1$. If this operation is successful, then GAR j; otherwise, set GAR=0.

BIPARTITION SHIFT-UP: Given address a in GAR, do G$_j$ G$_{j+1}$, GCH$_j$ GCH$_{j+1}$, $a \leq j < n$, and G$_n$ 0.

BIPARTITION SHIFT-DOWN: Given address a in GAR 1030, do Gj$_{+1}$ G$_j$, GCH$_{j+1}$ GCH$_j$, $a \leq j < n$.

It should be noted that a triple [G$_{i,1}$, G$_{i,2}$, GCH$_i$] corresponds to item [l, r; u] in S$_G$. For RANDOM READ, RANDOM WRITE, BIPARTITION SHIFT-UP and BIPARTITION SHIFT-DOWN operations, each triple (G$_{i,1}$, G$_{i,2}$, GCH$_i$) is treated as a superword. For simplicity, READ G and WRITE G 1005 are used to refer to RANDOM READ and WRITE on G 1005, respectively.

A more detailed block diagram of the channel scheduler 330 architecture is illustrated in FIG. 11. In FIG. 11 only data paths are shown and the control signals are omitted. Multiplexers (MUXs) and demultiplexers (DMUXs) are used for merging and branching data paths. Dashed data paths are from/to the control processor. Logic design details of an associative processor P$_M$* are presented in the appendix, which can be easily extended or restricted to construct P$_M$, P$_G$ and P$_L$.

The high-level description of an implementation of the LAUC-VF algorithm is presented below, based on the abstract LAUC-VF algorithm and the architecture described above.

The Hardware LAUC-VF Algorithm

The operations of this embodiment are grouped into substeps. A pair of language constructs "do-in-parallel" and "end-do" are used to enclose operations that can be performed in parallel.

Preprocessing

Assume that timer$_a$ is started at time t$_{sch}$(BHP$_i$-1) with initial value 0. Upon receiving BHP$_i$ at time t$_{sch}$(BHP$_i$), do the following:

in S$_G$. For RANDOM READ, RANDOM WRITE, BIPARTITION SHIFT-UP and BIPARTITION SHIFT-DOWN operations, each triple (G$_{i,1}$, G$_{i,2}$, GCH$_i$) is treated as a superword. For simplicity, READ G and WRITE G 1005 are used to refer to RANDOM READ and WRITE on G 1005, respectively.

A more detailed block diagram of the channel scheduler 330 architecture is illustrated in FIG. 11. In FIG. 11 only data paths are shown and the control signals are omitted. Multiplexers (MUXs) and demultiplexers (DMUXs) are used for merging and branching data paths. Dashed data paths are from/to the control processor. Logic design details of an associative processor P$_M$* are presented in the appendix, which can be easily extended or restricted to construct P$_M$, P$_G$ and P$_L$.

The high-level description of an implementation of the LAUC-VF algorithm is presented below, based on the abstract LAUC-VF algorithm and the architecture described above.

The Hardware LAUC-VF Algorithm

The operations of this embodiment are grouped into substeps. A pair of language constructs "do-in-parallel" and "end-do" are used to enclose operations that can be performed in parallel.

Preprocessing

Assume that $timer_a$ is started at time $t_{sch}(BHP_{i-1})$ with initial value 0. Upon receiving $BHP_i$ at time $t_{sch}(BHP_i)$, do the following:

do-in-parallel
  Stop $timer_a$; Start $timer_a$ with initial value 0;
  MC $timer_a$; $GC_1$ $timer_a$; $GC_2$ $timer_a$
end-do
do-in-parallel
  Perform PARALLEL SUBTRACTION operation on M;
  Perform PARALLEL SUBTRACTION operation on G;
end-do These operations update the relative times of all the events of $S_M$ and $S_G$ with $t_{sch}(BHP_i)$ as the new reference point.

Implementation of Step (a)
(a1) Without using FDL buffer, search in G for a containing gap. Do this step in parallel with Steps (b1) and (b2).
(a1.1) do-in-parallel
  $GC_1$ $T_i'$; $GC_2$ $T_i'$+length($DB_i$);
  $GR_2$ $T_i'$; $GR_1$ $T_i'$+length($DB_i$);
  (Note that $T_i'$ is given in Eq. (6).)
end-do
(a1.2) Perform PARALLEL DOUBLE-COMPARAND SEARCH operation on G.
(a2) if GAR≠0 (i.e. a containing gap is found) then
(a2.1) do-in-parallel
  Output GCHR and 0 as channel number and $L_{ri}$ for $DB_i$;
  $GDR_2$ $GR_2$, $GR_2$ $GDR_2$, $GC_1$ $GC_2$
end-do
(a2.2) if $GDR_2 - GDR_1 \geq \Delta$ then WRITE G else Perform BIPARTITION SHIFT-UP operation on G.
(a2.3) if $GR_2 - GR_1 < \Delta$ then stop.
(a2.4) perform PARALLEL SINGLE-COMPARAND SEARCH operation on G
(a2.5) do-in-parallel
  Perform BIPARTITION SHIFT-DOWN operation on G;
  $GDR_1$ $GR_1$, $GDR_2$ $GR_2$, $GR_2$ $GDR_2$.
end-do
(a2.6) WRITE G;
stop Implementation of Step (b)
(b1) MC $T_i'$
(b2) Perform PARALLEL SEARCH operation on M;
(b3) if $MAR_1$=0 (i.e. an entry is not found) then goto Step (c);
(b4) Update M and G:
(b4.1) do-in-parallel
  Output MCHR and 0, as the channel number and the output delay value, respectively, for $DB_i$;
  MC $T_i'$+length($DB_i$);
  $MDR_2$ $T_i'$+length($DB_i$);
  $MAR_2$ $MAR_1$; MR MCHR
end-do (b4.2) if $MDR_2 - MDR_1 \geq \Delta$
  do-in-parallel
  $GC_1$ $MDR_1$; $GDR_1$ $MDR_1$; $GDR_2$ $MDR_2$
  end-do
  Perform PARALLEL SINGLE-COMPARAND SEARCH operation on G; if GAR≠0 then perform BIPARTITION SHIFT-DOWN OPERATION on G and WRITE G;
(b4.3) Perform PARALLEL SEARCH operation on M;
(b4.4) if $MAR_1 \neq MAR_2$ then MCHR MR and perform SEGMENT SHIFT-DOWN operation on M;
(b4.5) WRITE M;
stop Implementation of Step (c)
(c1) $MAR_1$ k;
(c2) READ M;
(c3) LC $MDR_1 - T_i'$;
(c4) Perform PARALLEL SEARCH on L;
(c5) $LR_2$ LAR;
(c6) if LDR=0 then Flag 1 and go to Step (e1)

Implementation of Step (d)
(d1) MC LDR+$T_i'$;
(d2) Perform PARALLEL SEARCH operation on M;

Implementation of Step (e)
(e1) do-in-parallel
  $LR_1$ min $\{LAR, C_3\}$; LAR 1
end-do
(e2) for m=1 to $LR_1$ do
  READ L;
  do-in-parallel
  $GC_1$ $GR_2$+LDR, $GC_2$ $GR_1$+LDR
  A end-do
  Perform PARALLEL DOUBLE-COMPARAND SEARCH operation on G;
  if GAR≠0 (i.e. search is successful) then exit;
end for
(e3) if GAR≠0 then
(e3.1) do-in-parallel
  Output GCHR and LAR as channel number and $L_{ri}$ for $DB_i$; $GDR_2$ $GR_2$, $GR_2$ $GDR_2$, $GC_1$ $GC_2$
end-do
(e3.2) if $GDR_2 - GDR_1 \geq \Delta$ then WRITE G else
  Perform BIPARTITION SHIFT-UP operation on G;
(e3.3) if $GR_2 - GR_1 < \Delta$ then stop;
(e3.4) Perform PARALLEL SINGLE-COMPARAND SEARCH operation on G;
(e3.5) Perform BIPARTITION SHIFT-DOWN operation on G; $GDR_1$ $GR_2$, $GDR_2$ $GR_1$, $GR_2$ $GDR_2$
(e3.6) WRITE G;
stop Implementation of Step (f)
(f1) if Flag=1 then do-in-parallel Drop $DB_i$; Flag 0 end-do and stop;
(f2) Update M and G:
(f2.1) do-in-parallel
  Output MCHR and $LR_2$, as the channel number and the output delay value, respectively, for $DB_i$;
  MC $T_i'$+length($DB_i$);
  $MDR_2$ $T_i'$+length($DB_i$);
  $MAR_2$ $MAR_1$; MR MCHR
end-do
(f2.2) if $MDR_2 - MDR_1 \geq \Delta$
  do-in-parallel
  $GC_1$ $MDR_1$; $GDR_1$ $MDR_1$; $GDR_2$ $MDR_2$
  end-do Perform PARALLEL SINGLE-COMPARAND SEARCH operation on G; if GAR≠0 then perform BIPARTITION SHIFT-DOWN operation on G; WRITE G;
(f2.3) Perform PARALLEL SEARCH operation on M;
(f2.4) if $MAR_1 \neq MAR_2$ then MCHR MR and perform SEGMENT SHIFT-DOWN operation on M;
(f2.5) WRITE M;
stop.

The flowchart of implementation of LAUC-VF algorithm is depicted in FIG. 12. The control processor (CP), in FIG. 11, generates all the control signals for the proper operation of the hardware channel scheduler. Register initializations for some operations involve parameters extracted from a BHP, system clock, and local timers. These operations are summarized in Table 1. It is assumed that the arithmetic operations in these operations are performed in the control processor (CP). All the test operations are summarized in Table 2. It is assumed that these operations are also performed by the CP. Special instructions are implemented in CP, and the control signals can be generated using microprogramming (firmware). For better speed performance, hardwired control units can be constructed.

Let $T_{prep}$ denote the time required for preprocessing, and $T_{(x)}$ to denote the time required for Step (x). The worst case total time $T_{total}$ required for scheduling a DB using the above hardware implementation of LAUC-VF algorithm is $$T_{total} = T_{prep} + \max\{T_{(a1)}, T_{(b1)} + T_{(b2)}\} +$$
$$\max\{T_{(a2)}, T_{(b3)} + T_{(b4)}, T_{(b3)} + T_{(c)} + T_{(d)} + T_{(e3)},$$
$$T_{(b3)} + T_{(c)} + T_{(e)}, T_{(b3)} + T_{(c)} + T_{(e)} + T_{(f)}\}$$
$$= T_{prep} + \max\{T_{(a1)}, T_{(b1)} + T_{(b2)}\} +$$
$$\max\{T_{(a2)}, T_{(b3)} + T_{(b4)}, T_{(b3)} + T_{(c)} + T_{(d)} + T_{(e3)},$$
$$T_{(b3)} + T_{(c)} + T_{(e)} + T_{(f)}\}$$

Note that Step (a1) and part of Step (b) (specifically, Steps (b1) and (b2)) are executed in parallel. More parallelism can be explored to achieve better performance. Time $T_{(e)}$ depends on the number of iterations of the for-loop, which is bounded by a constant $c_3$. Thus, the time of $T_{total}$ is also bounded by a constant.

Special circuits can be constructed for test operations of Table 2 to alleviate the burden of the CP and reduce the wires connected to the CP. For example, a subtractor can be introduced between $MAR_1$ and $MAR_2$ so that testing $MAR_1=MAR_2$? can be done by this subtractor rather than by CP. Similarly, additional circuits can be introduced for other test operations in Table 2.

Some operations can be omitted to improve the time performance, and for example, if it is assumed that if a newly created gap is smaller than $\Delta$, a predefined threshold value, then this gap is not included in memory G. It is possible to include every newly created gap into G without testing it against $\Delta$ to save the time for testing. On the other hand, some operations can be added to improve the scheduling performance. For example, in Step (e2), a for-loop is utilized to check if there is a delay value among the first $c_3$ of $S_L$ such that by using it a gap can be found for transmitting $DB_i$. A more sophisticated approach may be used to select delay values in $S_L$ to get a better chance for finding a feasible delay value.

The $[M_j; MCH_j]$ pairs stored in $P_M$ are in the non-increasing order of the values in $M_j$'s, and $[G_{j,1}, G_{j,2}; GCH_j]$ triples stored in $P_G$ are in the non-increasing order of $G_{j,1}$'s. These orders, which are important in implementing the LAUC-VF algorithm, are maintained by shift operations using the linear array connections of the associative memory.

Treating the channel unscheduled times (semi-unbounded time intervals) in $P_M$ as special gaps, $P_M$ 710 and $P_G$ 720 can be integrated together in real chip design by adding an additional logic circuit to distinguish channel unscheduled times and actual gaps.

It will be apparent to those skilled in the art that various modifications and variations can be made in the Hardware Implementation of Channel Scheduling Algorithms for Optical Routers with FDL Buffers of the present invention and in construction of this invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Appendix

Logic Design of an Asociative Processor

It has been shown that the operations supported by associative processors $P_M$, $P_G$, and $P_L$ are used to implement the LAUC-VF channel scheduling algorithm. The purpose of this section is to demonstrate the easiness of realization of these processors. A logic circuit design is provided detailing an associative processor $P_{M^*}$ that captures the common features of $P_M$, $P_G$ and $P_L$. The structure of $P_{M^*}$ is illustrated in FIG. 13. By simple extensions and restrictions of this processor, a person of ordinary skill can derive the designs of $P_M$, $P_G$ and $P_L$.

Components $M^*$ is an associate memory of n words, $M^*_1, M^*_2, \ldots, M^*_n$, each of length m. Each word is associated with a subtraction circuit for subtraction and compare operations. The words are also connected as a linear array.

CR is a comparand register. It holds the operand to be compared with.

$AR_1, AR_2$ are address registers. They are used to hold addresses for accessing $M^*$.

DR is a data register. Together with ARs, it is used to access $M^*$.

A decoder is used to select the words of $M^*$ to be accessed by read, write and shift operations.

An encoder generates an address by a parallel search operation.

A control unit is used to generate control signals.

The decoder and encoder are separated from memory $M^*$ because of their distinctive and important functions for the proper operations of $P_{M^*}$.

Operations

Six operations are defined below. PARALLEL SUBTRACTION: For all words $M^j$, $1 \leq j \leq m$, do in parallel:

$$M_j^* \leftarrow \begin{cases} M_j^* - C, & \text{if } M_j^* \geq C \\ 0, & \text{otherwise} \end{cases}$$

RANDOM READ; Given address x in $AR_1$, do DR $\leftarrow M_x^*$.

RANDOM WRITE; Given address x in $AR_1$, do $M_x^* \leftarrow$ DR. PARALLEL SEARCH; The value of C is compared with the values of all words $M^*_1, M^*_2, \ldots, M^*_n$ simultaneously (in parallel). Find the smallest j such that $M_j^* < C$, and do $AR_1 \leftarrow j$ and $DR_1 \leftarrow M_j^*$. If there does not exist any word $M_j^*$ such that $M_j^* < C$, do $AR_1 \leftarrow 0$.

BIPARTITION SHIFT-UP: Given address a in $AR_1$, do $M^j \leftarrow M^{j+1}$ for $a \leq j < n$, and $M^n \leftarrow 0$.

BIPARTITION SHIFT-DOWN: Given address a in $AR_1$, do $M^{j+1} \leftarrow M^{j+1}$ for $a \leq j < n$.

SEGMENT SHIFT-DOWN: Given address a in $AR_1$ and address b in $AR_2$ such that b >a, shift the content of $M^*_j+1$ to $M^j$, perform $M^*_{j+1} \leftarrow M^j$ for $a-1 \leq j < b$.

Priority address encoder

A priority address encoder (simply, p-encoder) is a combinational circuit that has $2^p$ inputs, $T_0$ to $T_2^{p-1}$ and p outputs, $A_0$ to $A_{p-1}$. It generates the p-bit address of $T_j$ (i.e. The p-bit binary representation of j) if $T_j=1$, and $T_i=0$ for all $i < j$. If $T_1=0$, $0 \leq i \leq 2^p -1$, it generates the p-bit binary 0. This circuit is needed for the implementation of parallel search operation. A 2x1 p-encoder (for p=1) is shown in FIG. 14(A). The $2^p$ x p p-encoder for p >1 can be constructed using two copies of the $2^{p-1}$ x (p-1) priority encoder, as shown in FIG. 14 (B) and FIG. 14 (C) for p=2 and p=4, respectively, In such a design, the number of gate levels for a $2^p$ x p priority address decoder is $2_p$.

Address decoder

A p x $2^p$ decoder is a combinational circuit that has p inputs, $A_0$ to $A_{p-1}$, and outputs, $W_0$ to $W_{2p-1}$. It is needed to generate enabling signals for accessing a memory of $2^p$ words. Conventionally, one and only one output $W_i$ is 1, given that $A_{p-1} A_p 2 \ldots A_0$ is the binary representation of i. The 2x4 conventional decoder ("c-decoder") as shown in FIG. 15. A conventional decoder is used for random avcess of a memory.

Since for segment shift and bipartition shift operations, such a conventional decoder cannot generate all the word selection signals, a new address decoder is designed which contains a conventional decoder as a subcircuit.

First, a special p x $2^p$ decoder is presented, called a bipartition decoder ("b-decoder"). It has p inputs, $A_0$ to $A_{p-1}$, and $2^p$ outputs, $W_0$ to $W_{2p-1}$. The input/output relationship of such a decoder is: $W_i=1$ if $i \leq j$, with j's binary representation being $A_{p-1} A_{p-2} \ldots A_0$. The circuit for the 1x2 b-decoder is shown in FIG. 16(A). A p x $2^p$ b-decoder can be constructed using two copies of a (p-1) x $2^{p-1}$ b-decoder, as shown in FIG. 16(B) and FIG. 16(C) for p=2 and p=3, respectively. Clearly, there are 2p gate levels in a p x $2^p$ b-decoder. The input/output relationship of the 2x 4 b-decoder is shown in Table 3.

Using a p x $2^p$ c-decoder and two 2p x $2^p$ b-decoders, one can construct a p x $2^p$ generalized decoder. For short, it is called a g-decoder. A 2p x $2^p$ g-decoder has 2p inputs $A_{1,0}$, $A_{1,1} \ldots, A_{1,p-1}, A_{2,0}, A_{2,1} \ldots, A_{2,p-1}$, $2^p$ outputs $W_0, W_1, \ldots, W_{2p-1}$, and two control signals $S_0$ and $S_1$. Let $(A_{1,0} A_{1,1} \ldots A_{1,p-1})_{10}$ and $(A_{2,0} A_{2,1} \ldots A_{2,p-1})_{10}$ denote the decimal value of the binary number $A_{1,0} A_{1,1} \ldots A_{1,p-1}$ and $A_{2,0} A_{2,1} \ldots A_{2,p-1}$, respectively. The input/output relationship of such a decoder is specified as follows: if $S_1 S_0 = 00$, then $W_i=1$ if and only if $i=(A_{1,0} A_{1,1} \ldots A_{1,p-1})_{10}$; if $S_1 S_0=00$, then $W_i=1$ if and only if $i=(A_{1,0} A_{1,1} \ldots A_{1,p-1})_{10}$; if $S_1 S_0=01$, then $W_i=1$ if and only if $i \leq (A_{1,0} A_{1,1} \ldots A_{1,p-1})_{10}$; if $S_1 S_0=10$, then $W_i=1$ if and only if $i \leq (A_{1,0} A_{1,1} \ldots A_{1,p-1})_{10}$; and if $S_1 S_0 =11$, then $W_i=1$ if and only if $i \leq (A_{1,0} A_{1,1} \ldots A_{1,p-1})_{10}$ and $i \leq (A_{2,0} A_{2,1} \ldots A_{2,p-1})_{10}$. The logic diagram of a 2p x $2^p$ g-decoder, p32 2, is depicted in FIG. 17.

Let $W_{1,i}, 0 \leq i \leq 2^p$, be the outputs of the c-decoder, $W_{2,i}, 0 \leq i \leq 2^p$, be the outputs of the g-decoder. With two selection signals $S_0$ and $S_1$, T,0570 where ∧ and ∨ are logical AND and OR operations, respectively. Table 4 shows the input/output relationship of the 2p x $2^p$, p=2, g-decoder when $A_1 A_0=10$. The block diagram of a g-decoder is shown in FIG. 18.

Associative memory M*

The internal structure of a memory of n words with m bits per word consists of n x m storage cells and the associated logic needed for selecting words for reading and writing. A flip-flop is used to store one bit. A design of a storage cell of the present invention, called basic cell (BC) is shown in FIG. 19. It uses an RS flip-flop to store a bit, and it has four control signals, X, Y, Clr and R/W. The relevant control funcuions of the BC are summarized in Table 5. In this table, x indicates a "don't care" condition (either 0 or 1).

The parallel subtraction and search operations require to perform subtraction and compare operation on each word and the operand in CR. Since the compare operation can be implementd by subtraction, there is a need to associate an m-bit parallel subtractor with each memory word. The basic circuit unit of the parallel subtractor is called a subtractor cell (SC), and its logic diagram and block diagram are shown in (a) and (b) of FIG. 20, respectively. In this figure, FA stands for full adder. The control of the SC is summarized in Table 6.

Using m SCs, and m-bit parallel subtractor can be constructed as shown in FIG. 20(c). Let $B=B_{m-1}B_{m-2}\ldots B_0$ and $C=C_{m-1}C_{m-2}\ldots C_0$ be the two input binary numbers, and $F=hd$ $m-1F_{m-2}\ldots F_0$ be the output of this circuit. If Sub/Trans =1, this circuit performs a subtraction operation by an addition $F=B+\overline{C}+1$; $Carry_m=1$ if $B<C$. If Sub/Trans =0, then $F=B$ and $Carry_m=0$, and this circuit simply transfer B to its output F. As wll been seen shortly, the SCs associated with a memory word are connected to such a way to implement parallel subtraction, search (compare) and shift operations.

The design of a memory cell (MC) of the associative memory M* is shown in FIG. 21. Each MC is constructed using a pair of BC and SC. There are four inputs, $F_{i-1,j}$, $DR_j$, $F_{i+1,j}$ and $F_{i,j}$, to the BC, and the selection of any is by a multiplexer (MUX) with two selection signals $I_0$ and $I_1$. The roles of all inputs, output, and control lines can be understood when MCs are connected a a two-dimensional array.

Overall design of $P_{M^*}$

The individual components will now be combined to illustrate the overall structure of $P_{M^*}$. The configuration of $P_{M^*}$ that consists of 4 words with 3 bits per word is shown in FIG. 22. In FIG. 22, the 4x2 encoder is the priority encoder (see FIG. 14 (b)), and the 4x 4 decoder is the g-decoder (see FIG. 17). Each MC has a structure as shown ib FIG. 21. Control signals $S_0$, $S_1$, $S_2$, $S_3$, R/W, $I_0$, $I_1$, and $I_2$ are generated by the CU (control unit). The control signal values (except $S_0$, $S_1$, $S_2$ and $S_3$) for the operations of $P_{M^*}$ are listed in Table 7, wherein the clock signals are omitted.

Selection signals $S_0$, $S_1$, $S_2$ and $S_3$ must be specified for each of the operations. If $S_2=0$, outputs from the enoder are selected as the inputs of $AR_1$, and if $S_2=1$, CU provides the inputs for $AR_1$. If $S_3=0$, the memory word read from the memory is selected as the input of DR, and if $S_3=1$, the CU provides inputs for DR. To perform random read and write opertions, it must be $S_1 S_0=00$, and furthermore, $S_3$ should be 0 for read operations. For shift operations $S_1 S_0 \neq 00$. For parallel search operation, it must be 0, since the output of the priority encoder is transferred to $AR_1$. The inputs $SB_1$ of the encoder is the leftmost carry bit of the subtractor associated with word $M_i^*$. The control signals required for each of the operations of $P_{M^*}$ are listed in Table 7, where an x symbol indicates a "don't care condition"(i.e. either a 0 or a 1).

Let n, the number of words in M*, be 2P -1. Then a 2p x 2P g-decoder and a 2P x p p-encoder is used. It is important to note that word $M^*_0$ is a dummy word, which is not be used to store information. This is because address 0 is used to signify that a parallel search operation does not produce a valid address. By treating word $M^*_0$ as a dummy word, the circuit is simplified considerably.

A comparison of $P_{M^*}$ ith $P_M$, $P_G$ and $P_L$ reveals that associative processor $P_L$ is much simpler than $P_{M^*}$, since it does not need parallel subtraction, random write, and shift operations. Associative processor $P_M$ is an extension of $P_{M^*}$ by associating an MCH word with each word in M. Associative processor $P_G$ further extends P by allowing parallel searching with a single comparand and double comparands.

The design of $P_{M^*}$ given above operates in a parallel-by-word and parallel-by-bit fashion using the power of the arithmetic circuit associated with every word (see FIG. 20 (c)). It is easy to design an associative memory that operates in parallel-by-word but bit serial fashion. For such an associative memory, it is only need to associate each word in the memory with a circuit similar to the one shown in FIG. 20 (a). Then, a parallel search and a parallel subtraction operations is performed by a sequence of m steps, one bit slice is processed per step, where m is the word length. This approach simpliies the logic circuit by reducing the circuit elements, and consequently reduces the cost of the memory. However, lower speed is the price for such a gain.

Various techniques have been developed for constructing large VLSI RAM. These techniques can be used in the physical design of custom CAM (content-addressable memory) chips. For example, a hierarchical approach has been used in constructing RAM to ensure compact VLSI layout and good performance. Such a technique can also be applied to the construction of a CAM.

What is claimed is:

1. A method for implementing channel scheduling algorithms in an optical router, the method comprising the steps of:
   storing a set of channel unscheduled times from which a channel is free and corresponding channels $S_M$ at an associative process $P_M$;
   storing a set of voids/gaps and a corresponding channels $S_G$ at an associative processor $P_G$;
   determining availability of outbound data channels capable of carrying a data packet of duration B;
   selecting one channel from available data channels;
   assigning the data packet to the selected channel; and
   updating state information of the selected data channel, wherein the state information of a data channel includes channel unscheduled times for which the data channel has voids/gaps.

2. The method for implementing channel scheduling algorithms in an optical router according to claim 1, further including the steps of:
   if no data channel is available to carry the data packet, determining whether a time delay L is capable of being introduced to shift the arrival time of the data packet via fiber delay line (FDL), from t to (t+L); and
   if a time delay L is capable of being introduced, assigning the data packet a delay time equal to L and assigning the data packet to an appropriate outbound data channel.

3. The method for implementing channel scheduling algorithms in an optical router according to claim 1, wherein the selecting of a channel further comprises selecting a fiber and a wavelength from the outbound data channel group to transmit the data packet.

4. The method for implementing channel scheduling algorithms in an optical router according to claim 1, wherein the data packet is of a variable length.

5. The method for implementing channel scheduling algorithms in an optical router according to claim 2, wherein the selecting of a channel further comprises selecting a fiber and a wavelength from the outbound data channel group to transmit the data packet.

6. The method for implementing channel scheduling algorithms in an optical router according to claim 2, wherein the data packet is of a variable length.

7. The method for implementing channel scheduling algorithms in an optical router according to claim 1, wherein scheduled time of routing for each data packet that has not been transmitted is scheduled with a relative time based upon the start processing time of the data packet.

8. The method for implementing channel scheduling algorithms in an optical router according to claim 1, wherein if a void created by the insertion of a data packet on a channel is less than or equal to a duration Δ the void is not included in the state information as being available to carry a data packet.

9. The method for implementing channel scheduling algorithms in an optical router according to claim 1, further comprising performing a parallel search of the set of voids/gaps and the corresponding channels $S_G$ at associative process $P_G$ for the smallest available void/gap and the corresponding channel capable of accommodating a packet of duration B.

10. The method for implementing channel scheduling algorithms in an optical router according to claim 9, further comprising performing a parallel search of the set of channel unscheduled times from which the channel is free and the corresponding channels $S_M$ at associative processor $P_M$ for an unscheduled time and corresponding data channel.

11. The method of claim 10, further comprising the step of generating control signals for associative processors $P_M$ and $P_G$ at a control processor.

12. An apparatus for implementing channel scheduling algorithms in an optical router, the apparatus comprising:
   means for determining availability of outbound data channels capable of carrying a data packet of duration B, wherein such means for determining availability comprises:
     an associative processor $P_G$ capable of storing a set of voids/gaps and corresponding channels $S_G$ and performing a parallel search of the set of voids/gaps and corresponding channels $S_G$ for an available void/gap and corresponding channel capable of accommodating the data packet of duration B;
     an associative processor $P_M$ capable of storing a set of channel unscheduled times from which a channel is free and corresponding channels $S_M$; and
     conducting a parallel search of the set of channel unscheduled times from which a channel is free and corresponding channels $S_M$ for an unscheduled time interval and corresponding channel capable of accommodating the data packet;
   means for selecting one channel from available data channels;
   means for assigning the data packet to the selected channel; and
   means for updating state information of the selected data channel.

13. The apparatus for implementing channel scheduling algorithms in an optical router, according to claim 12, further including:
   if no data channel is available to carry the data packet, means for determining whether a data channel would be available if a time delay is introduced to shift the arrival time of the data packet via a fiber delay line (FDL);
   means to shift the arrival time of the data packet by a time delay via a fiber delay line and to assign the data packet to an appropriate outbound data channel if the outbound data channel would be available; and
   means for dropping the data packet if no data channel is available to carry the data packet.

14. The apparatus according to claim 12, wherein the data packet is of a variable length.

15. The apparatus according to claim 12, wherein scheduled time of routing for each data packet that has not been transmitted is scheduled with a relative time based upon the start processing time of the data packet.

16. The apparatus according to claim 12, wherein the associative processor $P_G$ does not store voids/gaps of a channel if such void/gap is less than or equal to a duration Δ.

17. The apparatus according to claim 12 wherein, if multiple voids/gaps are available to accommodate the data packet of duration B, the smallest available void gap is selected.

18. The apparatus according to claim 17 wherein the search of the set of void/gaps and corresponding channels $S_G$ and the search of the set of channel unscheduled times from which a channel is free and corresponding channels $S_M$ is conducted simultaneously.

19. The apparatus of claim 13, further comprising means of generating control signals for associative processors $P_M$ and $P_G$ via an arithmetic-logic unit.

20. The apparatus according to claim 12 wherein, if multiple voids/gaps are available to accommodate data packet of duration B, the smallest available void gap is selected.

21. The apparatus according to claim 12 wherein associative processor $P_L$ is further capable of searching the set of possible time delays $S_L$ for a time delay L which is capable of being introduced such that in available gap and corresponding channel may be utilized to accommodate the data packet.

22. The apparatus according to claim 12, wherein a new reference time for each data packet under consideration is set to a time t=0 upon starting the channel scheduling process and the state information of the data channel group are updated simultaneously according to the new reference time of t=0.

23. The apparatus according to claim 12, wherein the means for selecting one channel from the available data channels further comprises means of selecting the channel via a round robin method.

24. The apparatus according to claim 12, wherein the means for selecting one channel from the available data channels further comprises means of selecting the channel via a random method.

25. The apparatus according to claim 12, wherein the means for selecting one channel from the available data channels further comprises means of selecting the channel via a predetermined method.

26. The apparatus according to claim 12, wherein the means for selecting one channel from the available data channels further comprises means of selecting the channel via a latest available unused channel method with void filling.

* * * * *